INVENTOR.
Howard G. Allen
Theodore M. Wright
Elden R. Kenison
BY Eyre, Mann & Burrows
ATTORNEYS

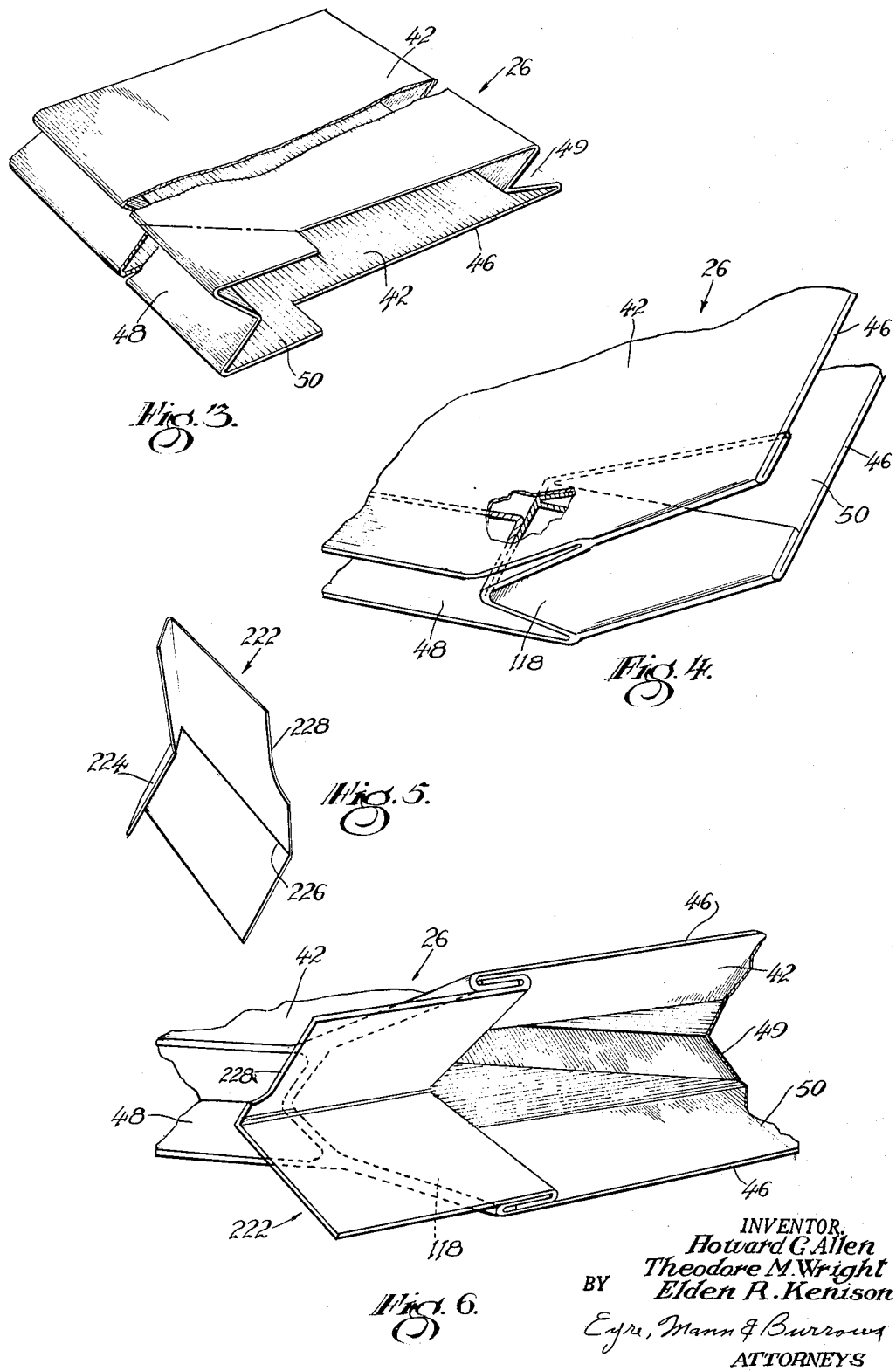

April 3, 1956  H. G. ALLEN ET AL  2,740,334
BAG VALVING AND SLEEVING APPARATUS
Filed June 4, 1952  16 Sheets-Sheet 4

INVENTOR.
Howard G. Allen
Theodore M. Wright
Elden R. Kenison
BY
Eyre, Mann, & Burrows
ATTORNEYS INVENTOR.
Howard G. Allen
Theodore M. Wright
Elden R. Kenison
BY
Eyre, Mann & Burrows
ATTORNEYS

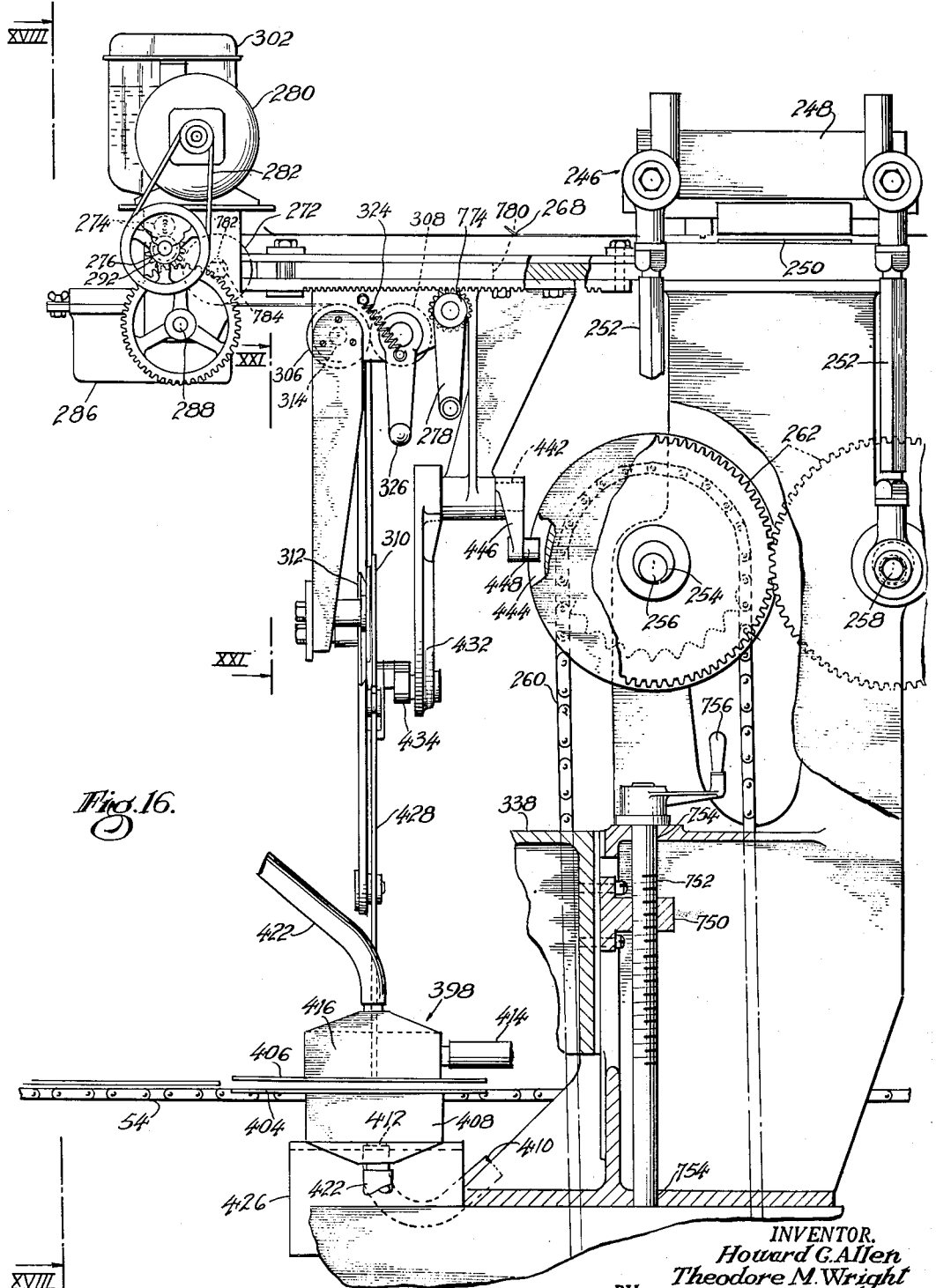

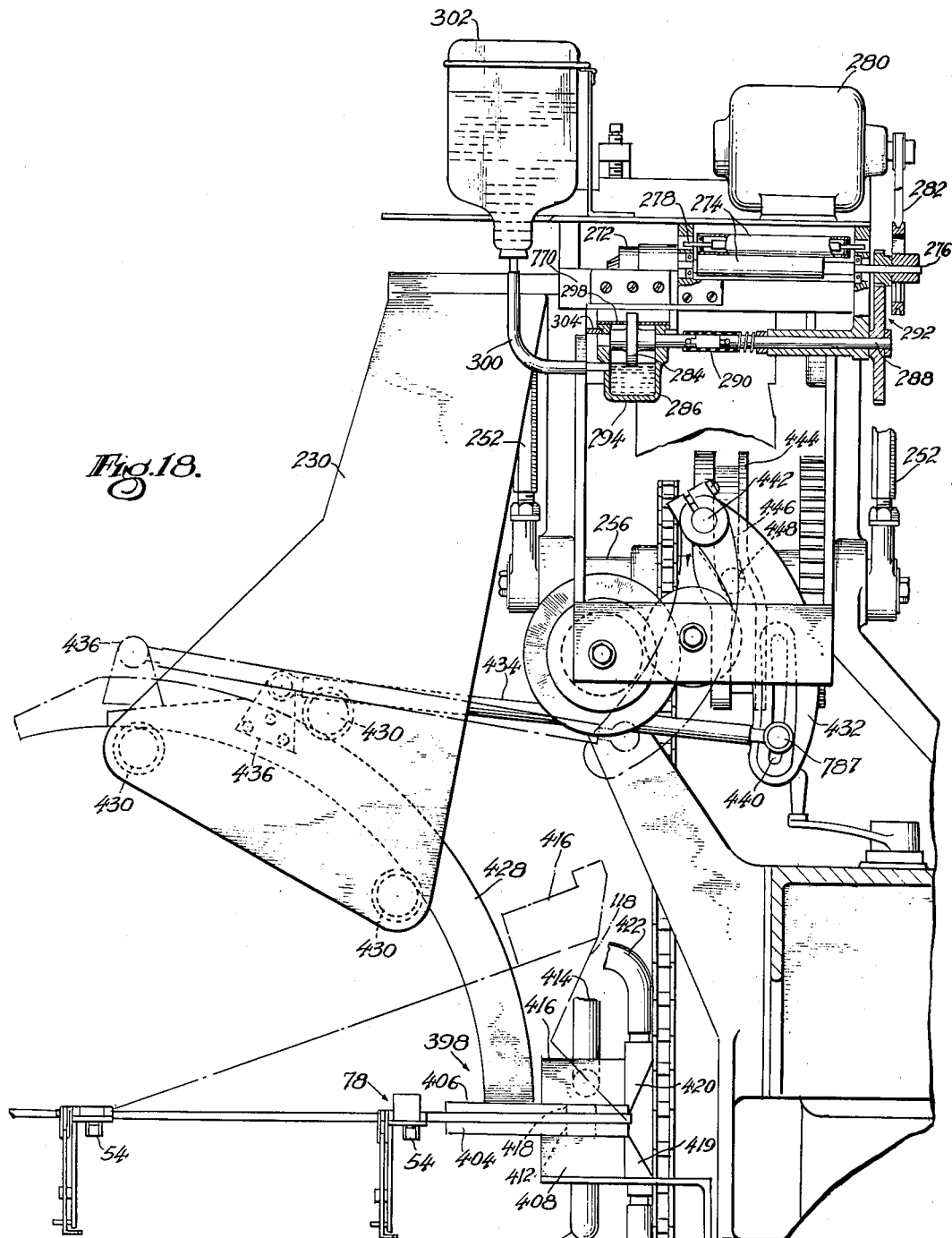

April 3, 1956  H. G. ALLEN ET AL  2,740,334
BAG VALVING AND SLEEVING APPARATUS
Filed June 4, 1952  16 Sheets-Sheet 10

INVENTOR.
Howard G. Allen
Theodore M. Wright
Elden R. Kenison
BY
Eyre, Mann & Burrows
ATTORNEYS

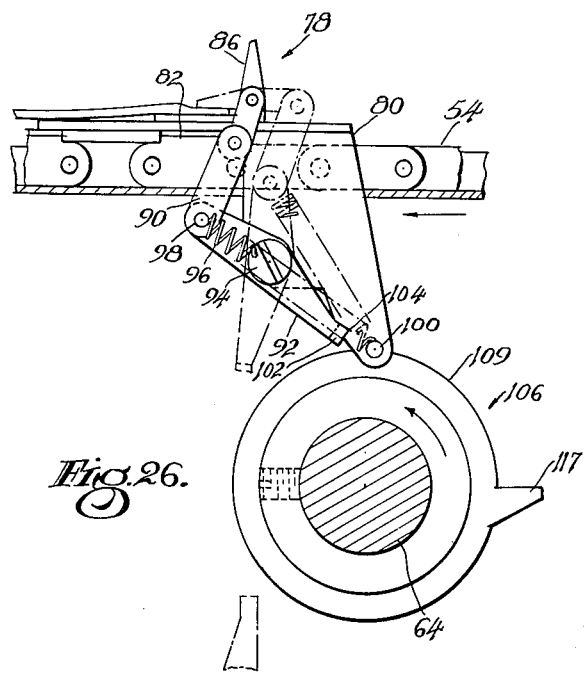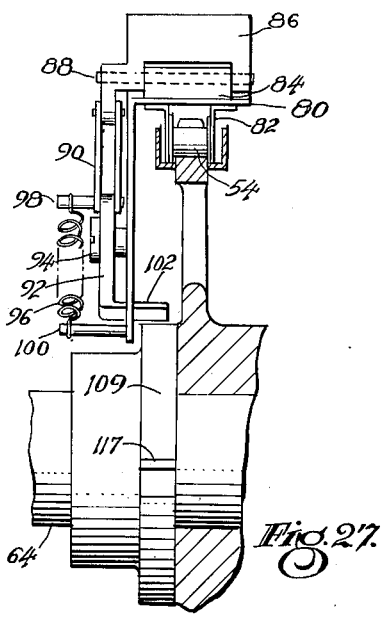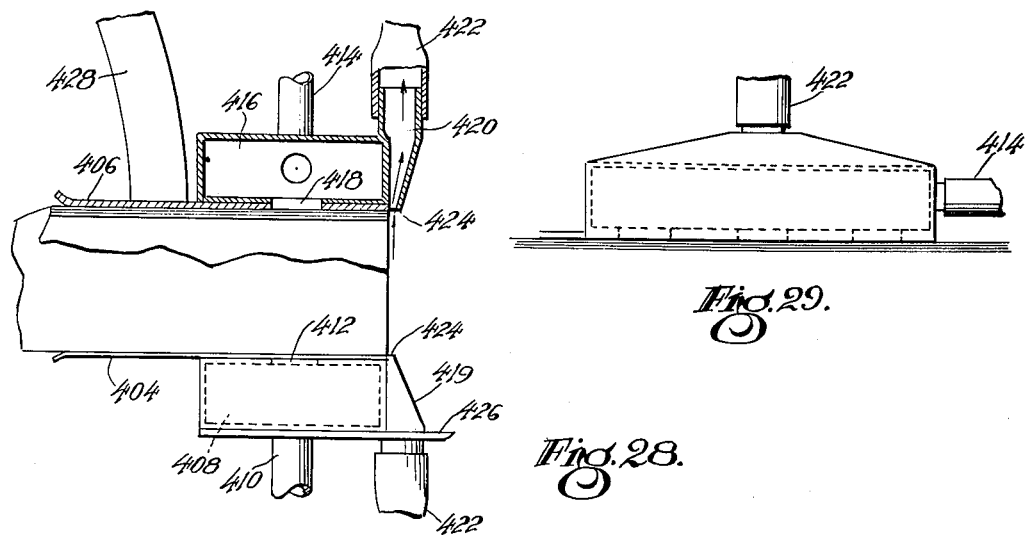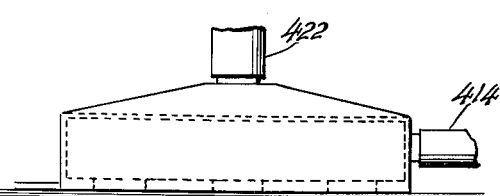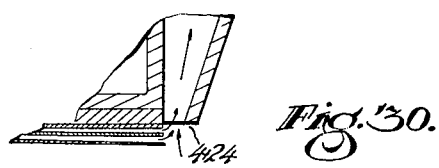

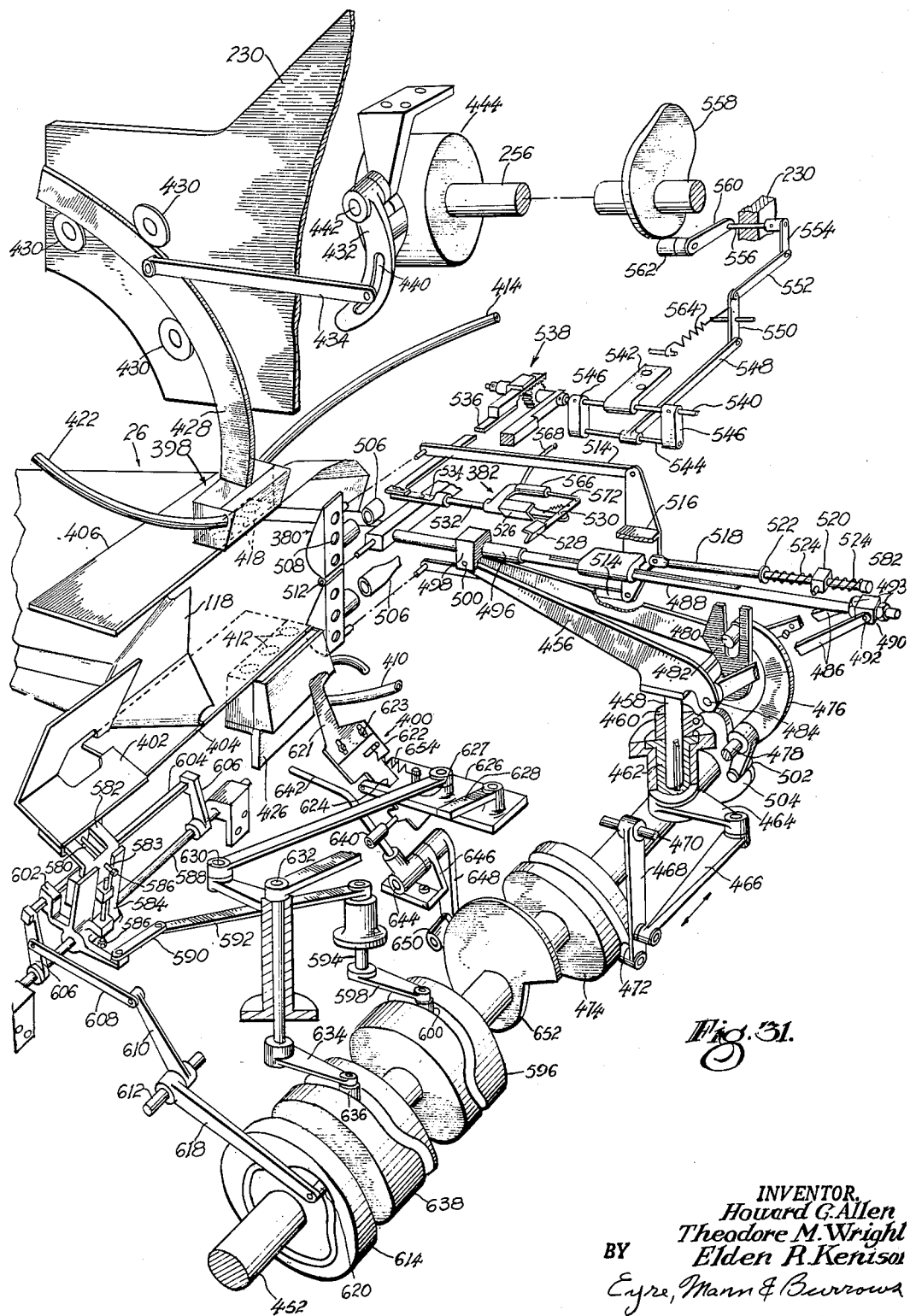

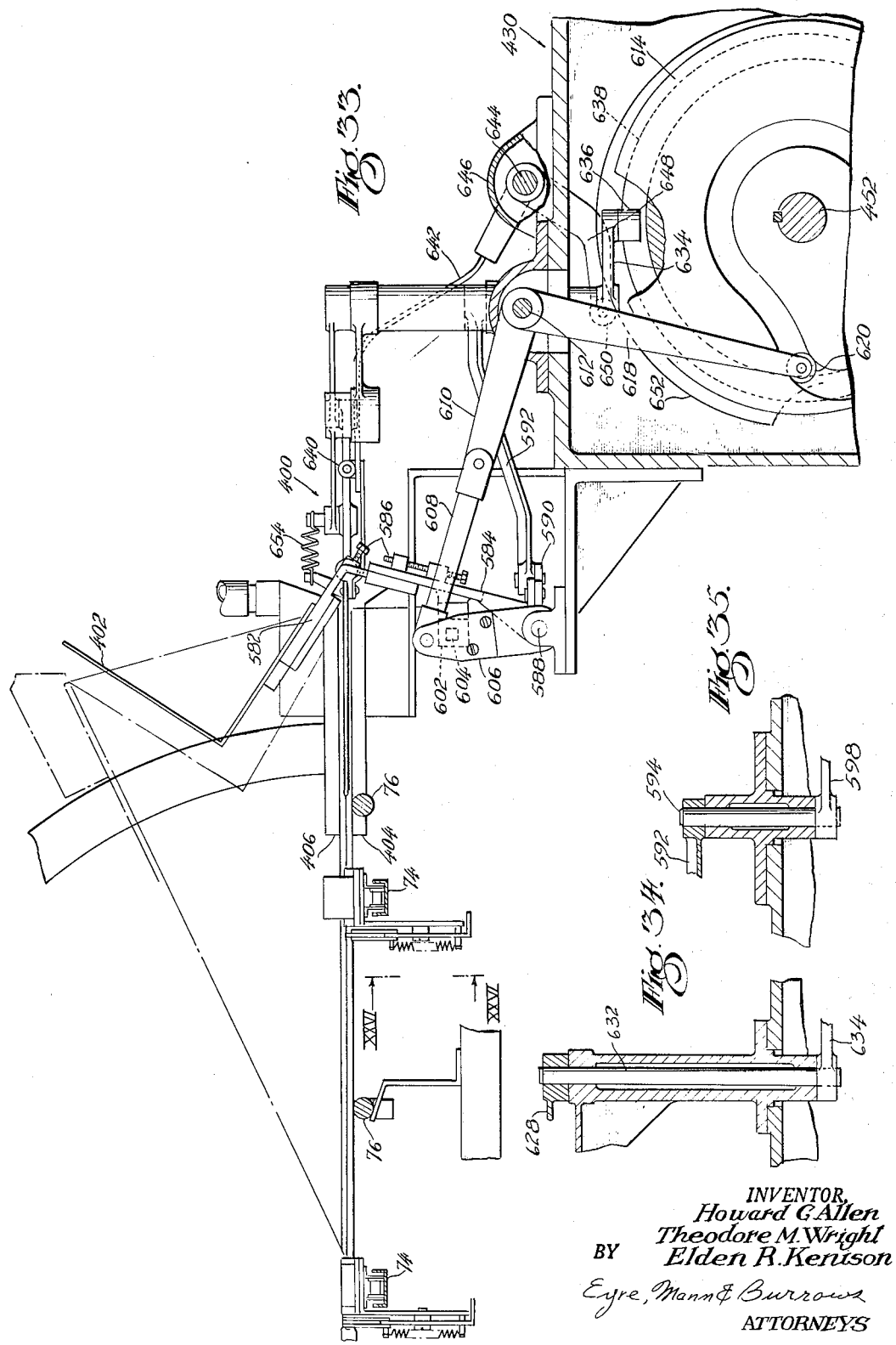

April 3, 1956 H. G. ALLEN ET AL 2,740,334
BAG VALVING AND SLEEVING APPARATUS
Filed June 4, 1952 16 Sheets-Sheet 15
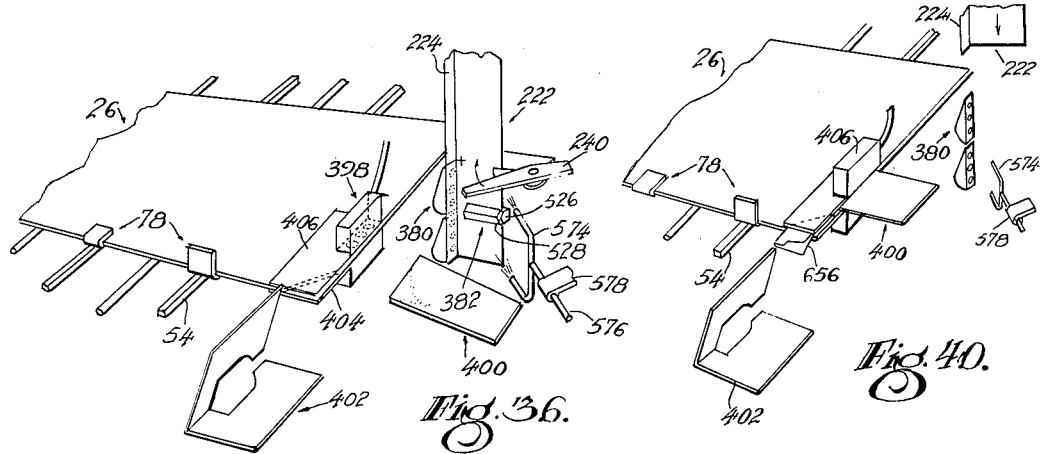
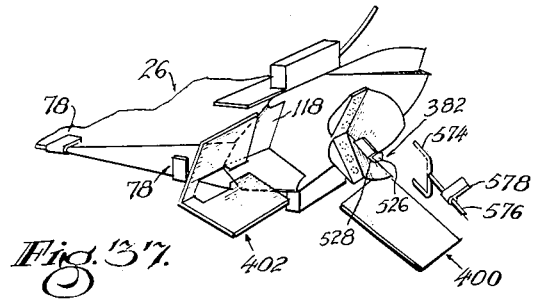
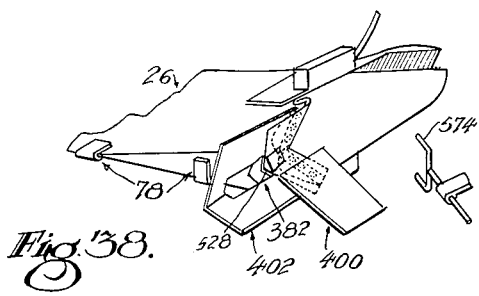
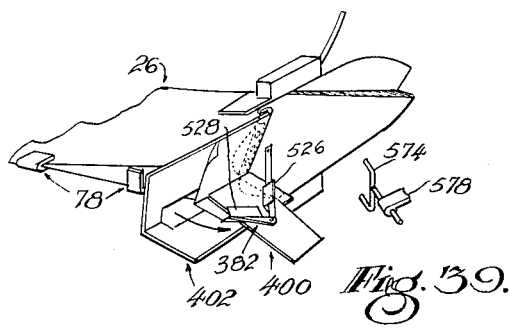
INVENTOR.
Howard G. Allen
Theodore M. Wright
BY Elden R. Kenison
Eyre, Mann, Burroughs
ATTORNEYS

United States Patent Office 2,740,334
Patented Apr. 3, 1956

2,740,334

BAG VALVING AND SLEEVING APPARATUS

Howard G. Allen, Niagara Falls, and Theodore M. Wright, Eggertsville, N. Y., and Elden R. Kenison, Compton, Calif., assignors to Multiwall Research Institute, Inc., a corporation of New York Application June 4, 1952, Serial No. 291,758

21 Claims. (Cl. 93—8)

This invention relates to a machine which is used to valve one corner of a paper bag blank and then insert a supplemental sheet of paper into the valve of a paper bag to form a sleeve which facilitates sealing the finished bag after filling. Our machine is intended primarily for use on a standard multiwall bag of the type comprising a preformed paper envelope with walls of several plies folded in to make a gusset on either side.

In carrying out our invention, we provide a valving station and a sleeving station connected by a conveyor which feeds a bag blank into the valving station and at the same time moves a valved bag blank from the valving station to the sleeving station. The blanks are held stationary at both stations while the valving and sleeving operations take place. At the valving station the gusset at an open corner of each bag is tucked in and held in place while it is creased and pressed to form the finished valve. The bag is then conveyed to the sleeving station where the valve walls are opened to form an approximate right angle with each other and receive a sheet of paper which is in three-dimensional form to stiffen it so that the sheet remains in a set position while it is being inserted into the valve. After the sheet is in place the valve is pressed closed to crease the sheet into sleeve form within the valve.

Figure 1:
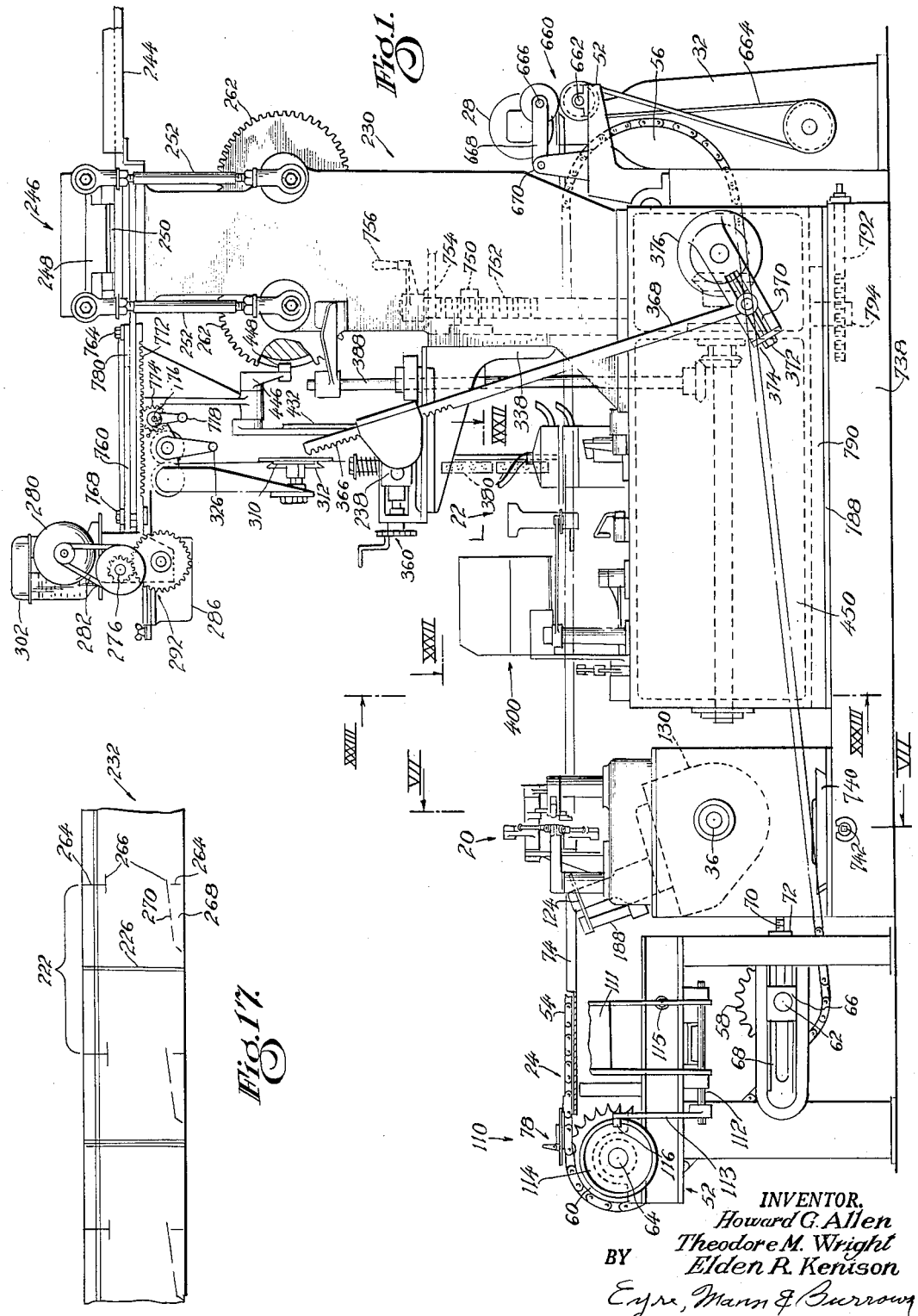
Figure 2:
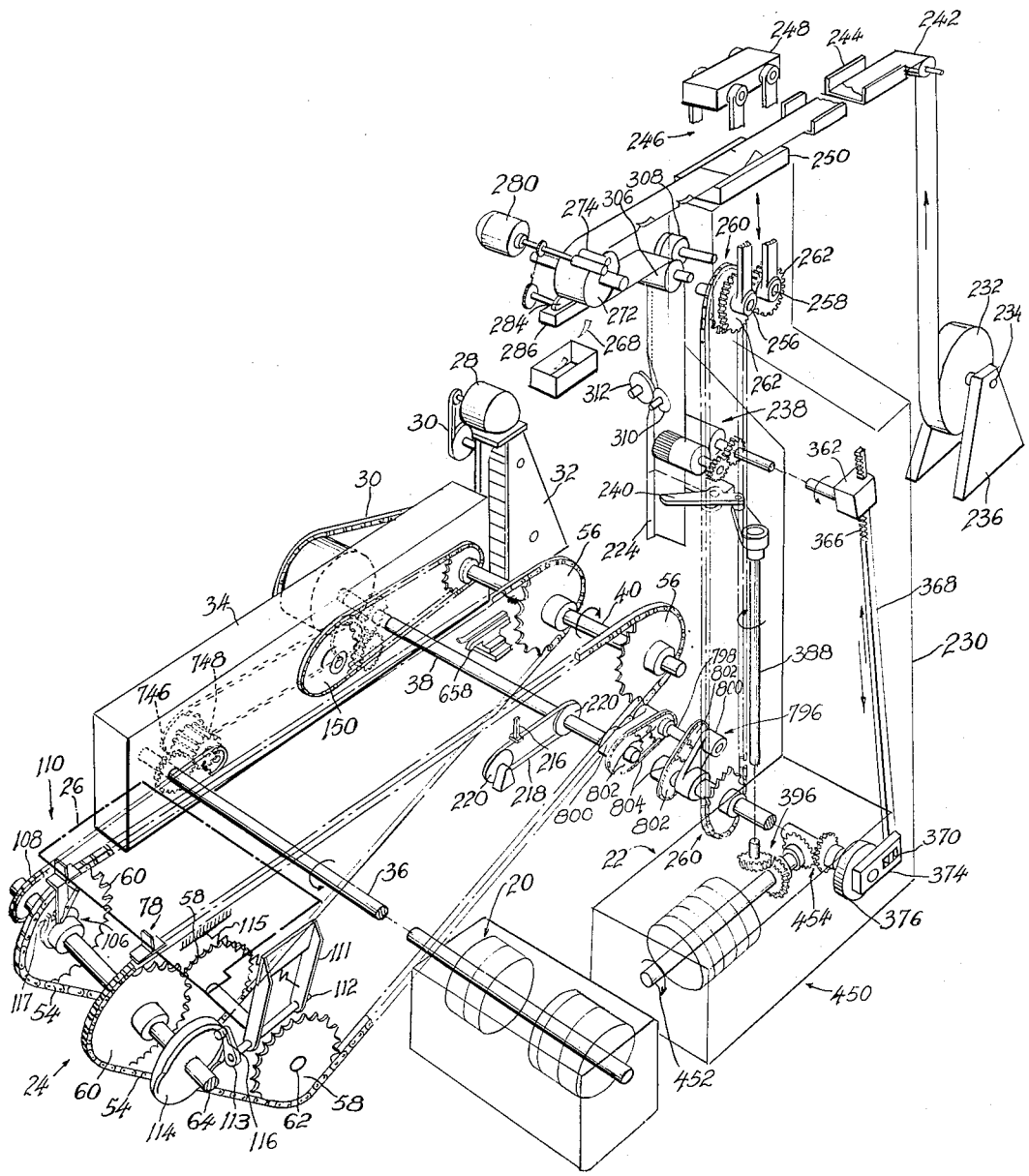
Figure 7:
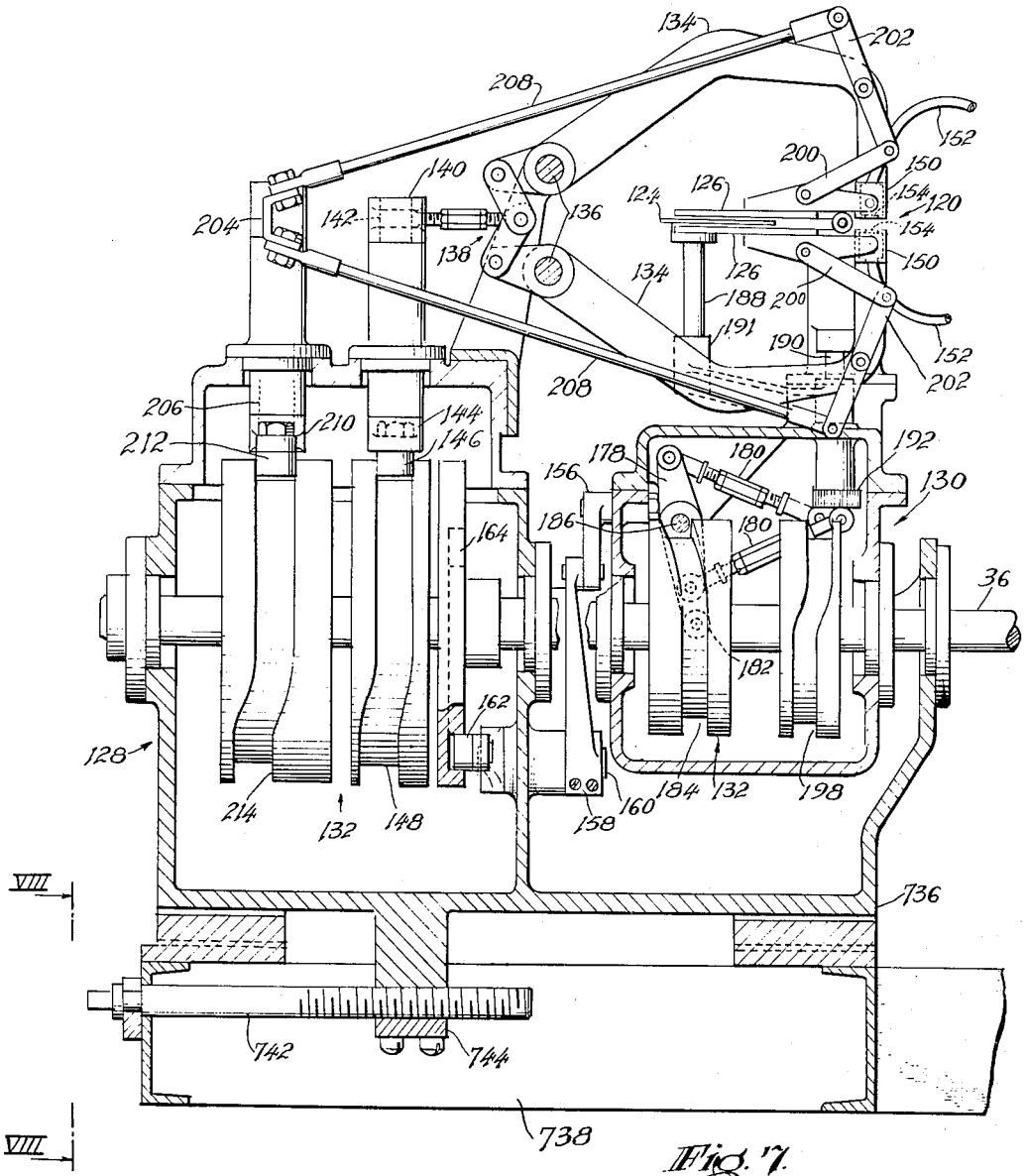
Figure 8:
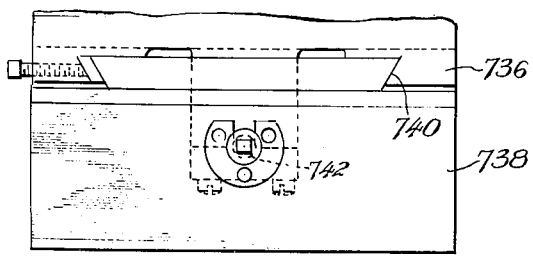
Figure 9:
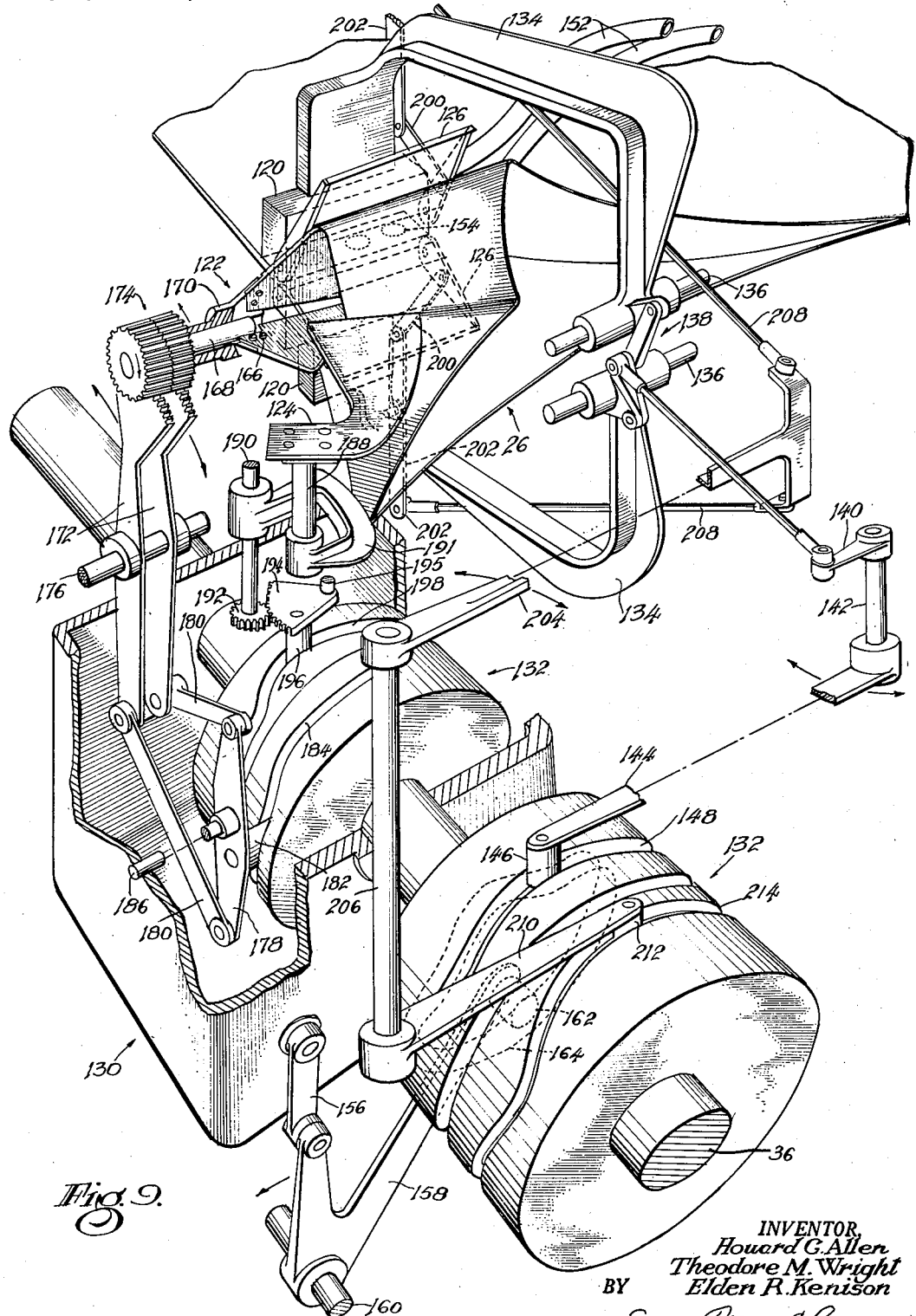
Figure 10:
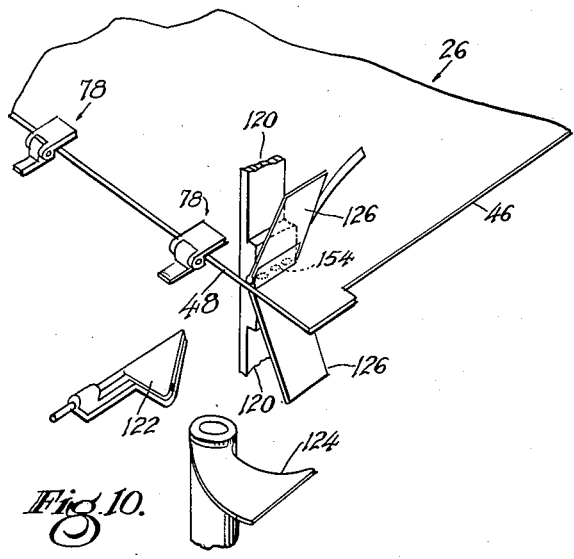
Figure 19:
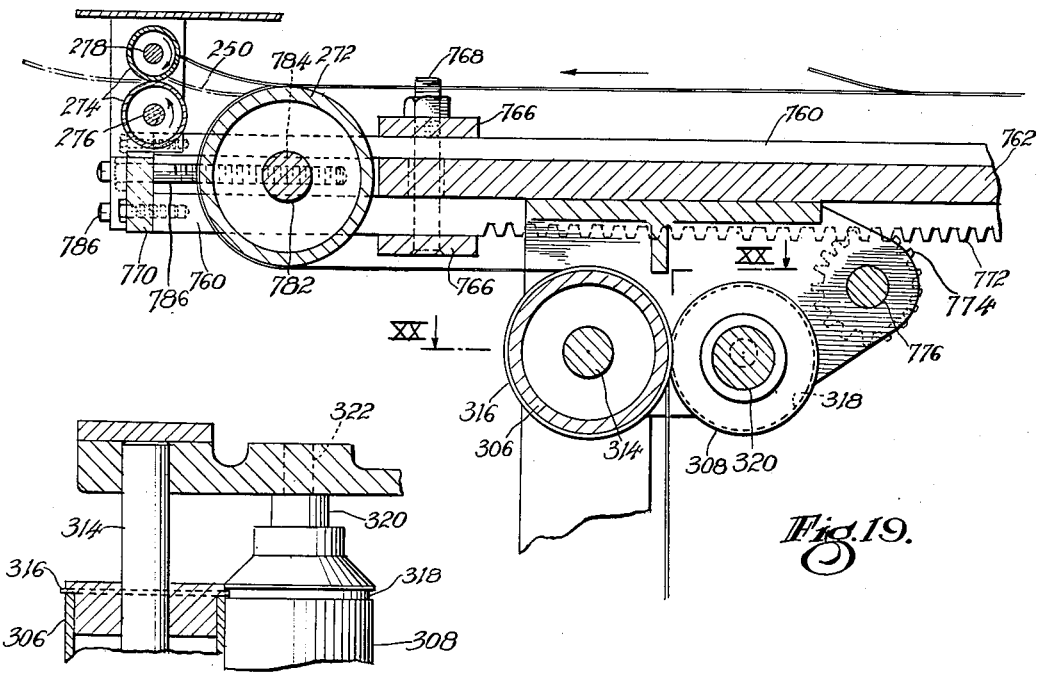
Figure 22:
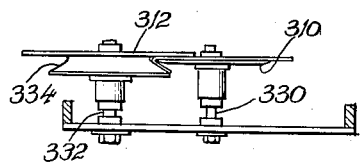
Figure 21:
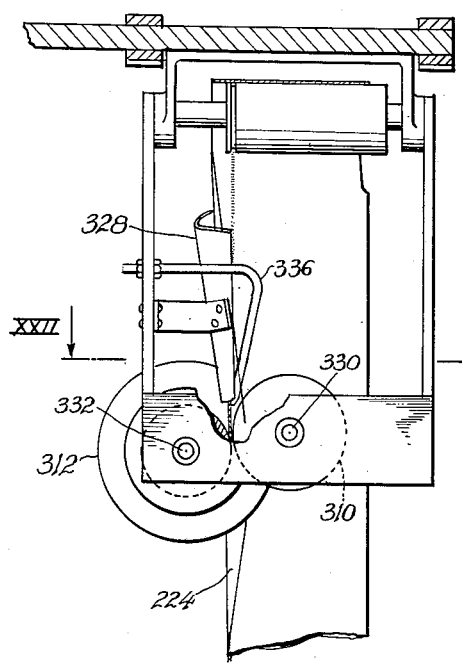
Figure 19A:
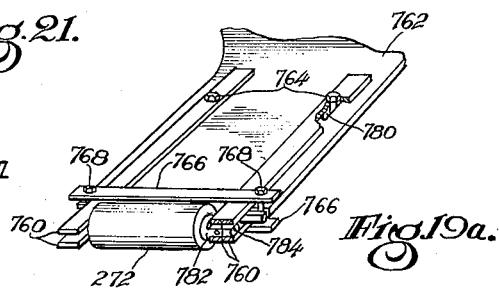
Figures 23, 25:
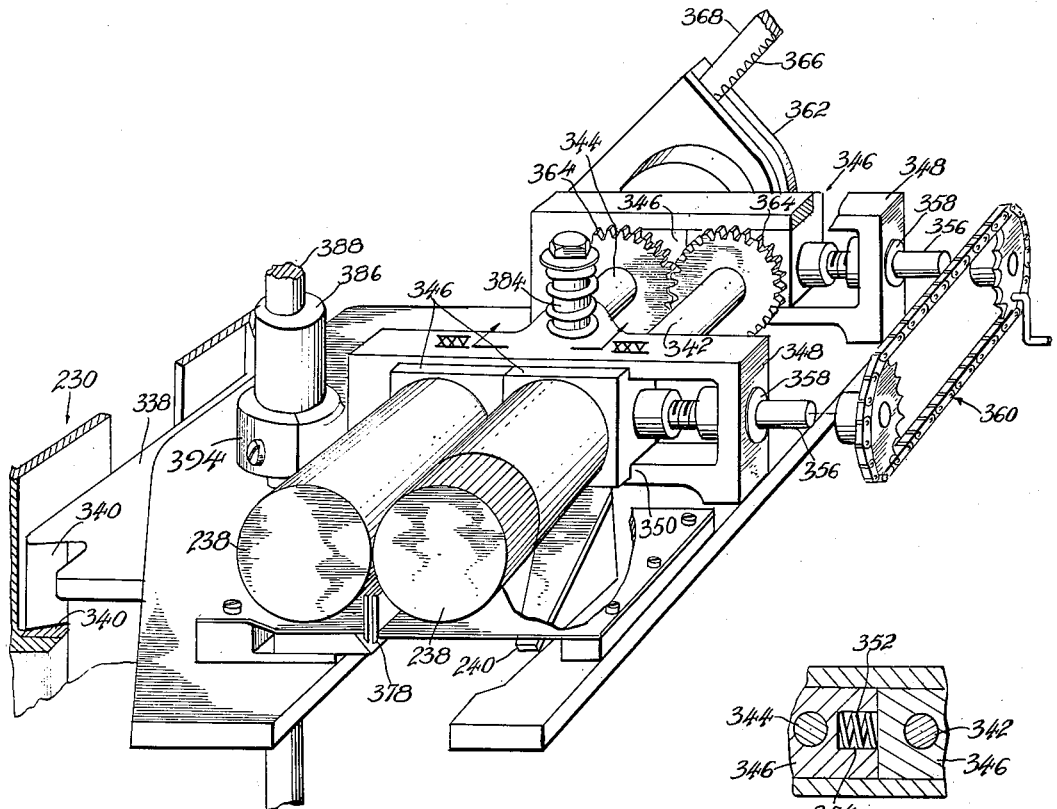
Figure 24:
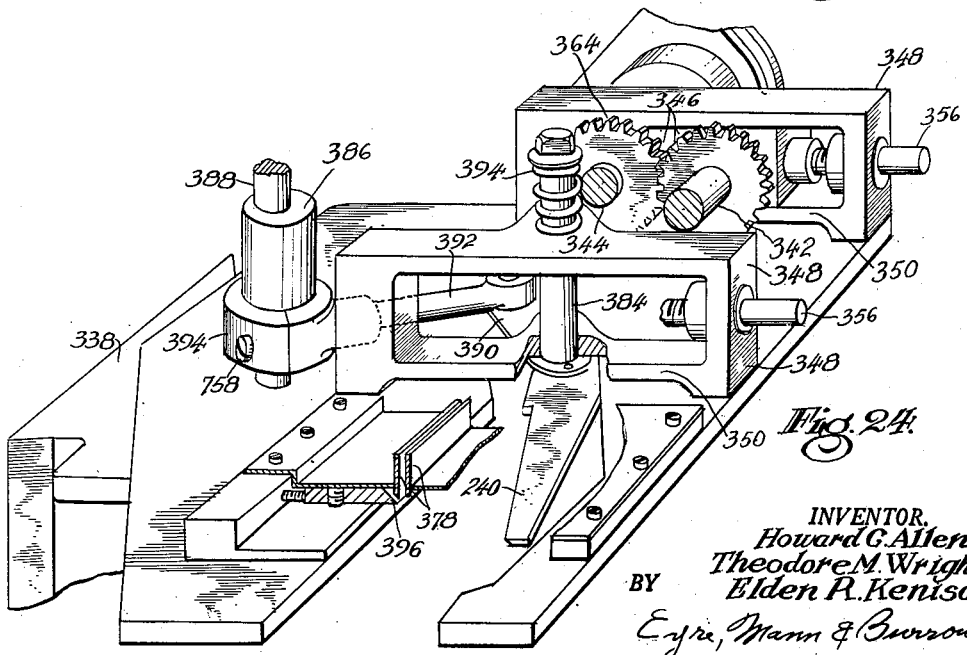
Figure 32:
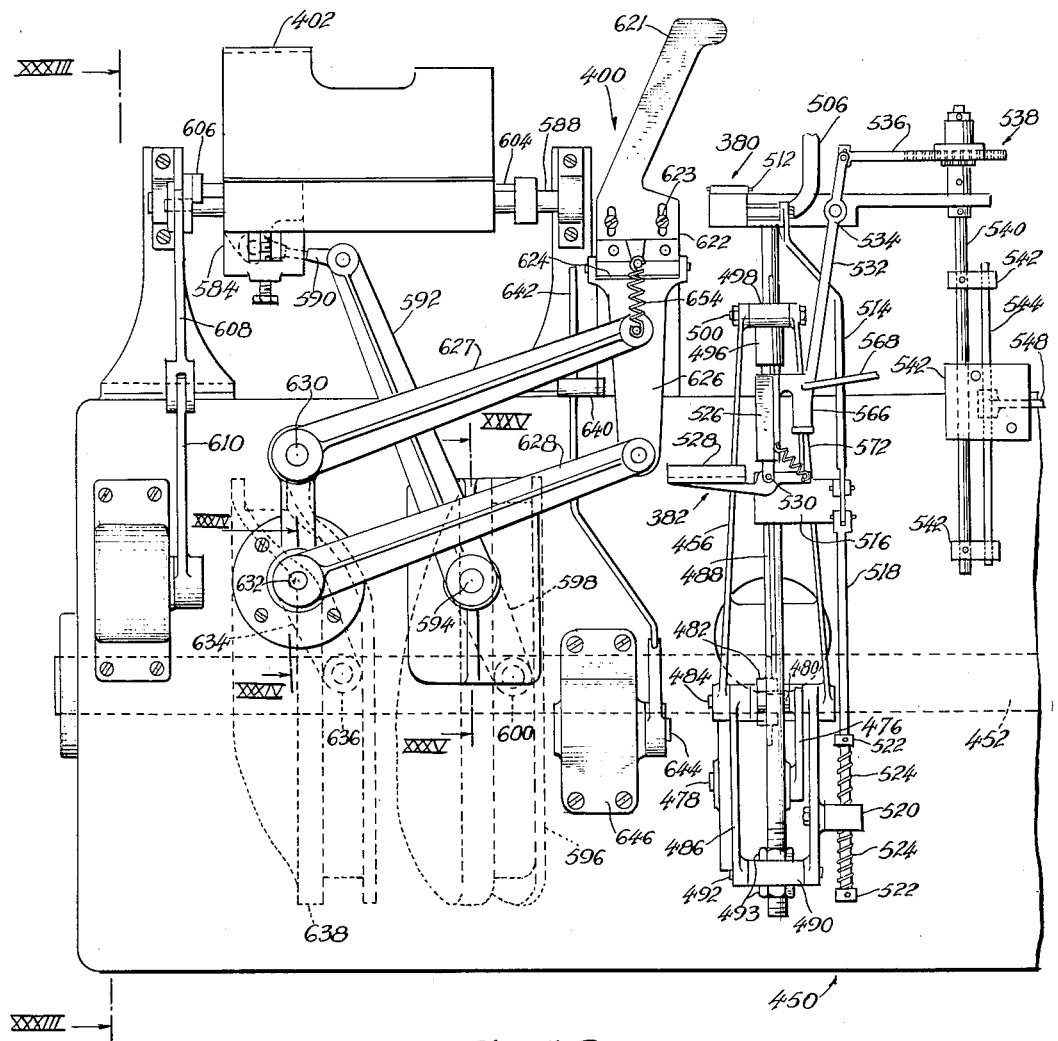
Figure 41:
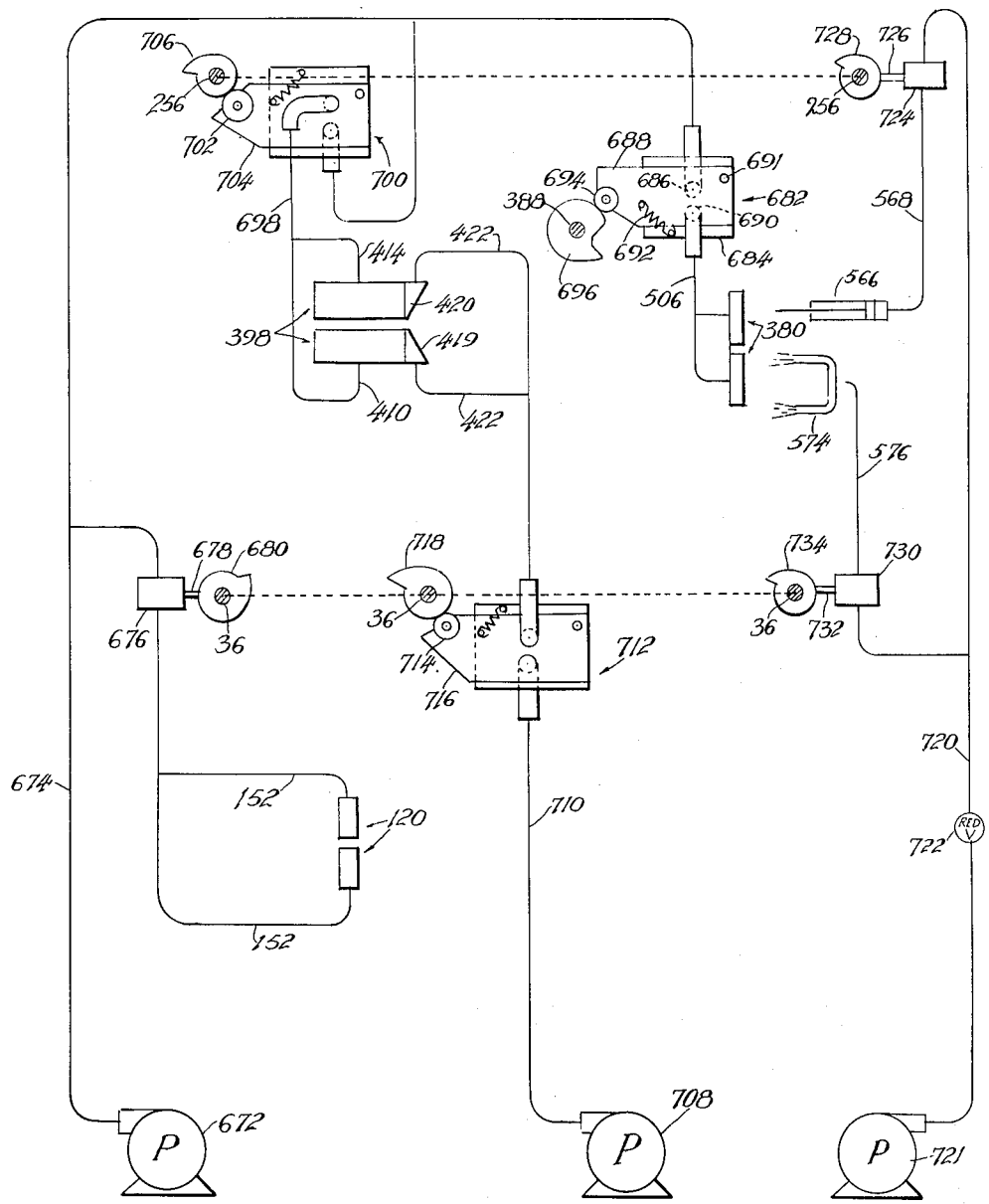

Our invention can be readily understood by reference to the accompanying drawings in which Fig. 1 is a front elevational view of our invention; Fig. 2 is a perspective diagrammatic view of Fig. 1 with some parts omitted for clarity; Fig. 3 is a perspective view of a bag blank on which the machine operates; Fig. 4 illustrates a bag blank with the valve formed therein; Fig. 5 shows a sleeve member; Fig. 6 is a perspective view of a valved bag blank with a sleeve inserted therein; Fig. 7 is a sectional view of the valving station taken on line 7—7 of Fig. 1; Fig. 8 is a front view taken on line 8—8 of Fig. 7; Fig. 9 is a detailed perspective view of the valving mechanism; Figs. 10 through 15 are diagrammatic views illustrating the valving operation; Fig. 16 is a detailed front elevational view of the sleeve member forming mechanism; Fig. 17 shows the outline of a sleeve member made in a continuous strip of paper by the forming mechanism; Fig. 18 is taken on line 18—18 of Fig. 16; Fig. 19 is a detailed front elevational view of the top left end portion of the sleeve member forming mechanism of Fig. 16; Fig. 19a is a diagrammatic view of Fig. 19; Fig. 20 is taken on line 20—20 of Fig. 19; Fig. 21 is taken on line 21—21 of Fig. 16; Fig. 22 is taken on line 22—22 of Fig. 21; Fig. 23 is a detailed perspective view of the pinch rolls and knife which feed and cut the paper used in forming the sleeve member; Fig. 24 is a similar view with the rolls omitted for clarity; Fig. 25 is a sectional view taken on line 25—25 of Fig. 23; Fig. 26 is a front elevational view of the bag clamp; Fig. 27 is a side view of the clamp; Fig. 28 is a side view of the vacuum manifold used for opening the bag at the sleeving station; Fig. 29 is a front view of the manifold and Fig. 30 is an enlarged sectional view showing air flow at the bag mouth into the vacuum manifold; Fig. 31 is a detailed perspective view of the sleeving mechanism simplified to illustrate its construction; Fig. 32 is a plan view taken on line 32—32 of Fig. 1; Fig. 33 is a side view of the sleeving mechanism taken on line 33—33 of Fig. 1; Fig. 34 and Fig. 35 are detailed sectional views taken on lines 34—34 and 35—35 respectively of Fig. 32 and Figs. 36 through 40 are diagrammatic views which illustrate the sleeving operation and Fig. 41 is a diagrammatic view of the vacuum and compressed air systems.

The machine illustrated in the drawings comprises two main operating stations, a valving station 20 and a sleeving station 22 which are connected by a link belt conveyor 24 for moving bag blanks 26 from left to right through the stations (see Figs. 1 and 2). The entire machine is driven by an electric motor 28 which transmits power through belts 30 and speed reducer 32 to gear box 34. Gear box 34 in turn distributes this power to the operating stations and conveyor 24 by means of three primary drive shafts, a valving station drive shaft 36, a sleeving station drive shaft 38, and a conveyor drive shaft 40.

Bag blanks 26 (see Fig. 3) on which the stations operate preferably consist of a preformed paper envelope having walls 42 ordinarily but not necessarily of several plies of paper having an open end or mouth 46. Opposite sides of the envelope are folded inwardly and creased to form the usual gussets 48 and 49 and if desired a portion of the envelope may extend beyond mouth 46 to form a flap 50. For convenience the words "bag blank" and "bag" will be used interchangeably to designate bag blank 26.

The various members of bag conveyor 24 are mounted in frame 52 and include a pair of ordinary link belts 54 carried by driving sprockets 56 and idler sprockets 58 and 60 (Fig. 2). Driving sprockets 56 are mounted on primary drive shaft 40 which is actuated by a Geneva gear in gear box 34 to give an intermittent feed. The Geneva gear so controls conveyor 24 that successive bag blanks 26 are simultaneously fed into a set position at valving station 20 and sleeving station 22 and held stationary while the valving and sleeving operations take place. As soon as these operations are completed belts 54 move ahead again and feed a new bag to each station.

Idler sprockets 58 and 60 run freely on shafts 62 and 64 respectively and bearing blocks 66 (Fig. 1) of shaft 62 are mounted on slides 68 so that the position of sprockets 58 may be changed to adjust the tension in belts 54. The position of sprockets 58 is readily changed by turning bolts 70 which are attached to bearing blocks 66 and are in threaded engagement with collar 72. A pair of shallow troughs 74 mounted in frame 52 provide added support for belts 54 and rods 76 (Fig. 33) assist in holding bag blanks 26 in a level position across the belts.

A number of bag clamps 78 spaced in pairs along belts 54 are provided to grip the bags and hold them in a set position across the belts. The detailed construction of clamp 78 is shown in Figs. 26 and 27. Turning now to these figures, base plate 80 mounted on link belt 54 by brackets 82 has an upright flange 84 which pivotally mounts clamping plate 86 by means of pin 88. Link 90 connects clamping plate 86 with arm 92 which is pivotally mounted on the side of base plate 80 by swivel bolt 94. Spring 96 stretched between pin 98 of link 90 and pin 100 of base plate 80 holds clamping plate 86 in either the open or closed position. In the open position the line of tension of spring 96 is below dead center of swivel bolt 94 and lug 102 of arm 92 is held in notch 104. In the closed position the line of spring tension is above dead center of swivel bolt 94 so that lug 102 is held away from notch 104 and clamping plate 86 is held down against base plate 80 as shown in dotted lines of Fig. 26.

Various cams (later described) along the line of travel of lug 102 hit the lug and move arm 92 which changes the line of spring tension to open and close clamp 78 as required for operation. The first pair of these are cams 106 mounted inside sprockets 60 on shaft 64 (see Figs. 2 and 26). Although sprockets 60 idle on shaft 64, the shaft itself is constantly driven from gear box 34 by the chain and sprocket indicated at 108 (Fig. 2) and thus cams 106 constantly rotate even though belts 54 are not in motion.

In operation as a pair of clamps 78 go around sprockets 60, lugs 102 are held in notches 104 by bearing surfaces 109 of cams 106 (Fig. 27) and as a result clamps 78 are open when they reach the position indicated at 110 in Fig. 2. At this time the Geneva gear in gear box 34 stops belts 54 for the valving and sleeving operation and a bag blank 26 is then placed across the belts by the operator or by a mechanical bag feeder. The bag blank is accurately positioned on belts 54 by placing gusset 48 against the base of clamping plates 86 and bag mouth 46 against guide plate 111. Guide plate 111 is pivotally mounted on rock shaft 112 and this shaft carries an arm 113 which is held in contact with cam 114 of shaft 64 by means of spring 115 and roller 116 (Fig. 2). As roller 116 follows the periphery of cam 114 it moves guide plate 111 back and forth and the timing of cam 114 is such that guide plate 111 pushes each bag blank into a set position across belts 54. Just before the belts start to move again, projections 117 on cams 106 (Fig. 26) hit lugs 102 and move them away from notches 104 to close clamping plates 86 over the rear edge of bag blank 26. This blank is then conveyed to station 20 for valving.

Briefly stated in forming valve 118 (Figs. 4 and 10 through 15) the bag is first clamped across gusset 48 near mouth 46. The bag walls are separated at this corner by opening gusset 48 which is then tucked into the bag along with a portion of the walls. The walls are then collapsed and the folded material is securely held between them while it is creased to form the finished valve. The various members of valving station 20 which operate directly on bag blank 26 for this purpose include vacuum clamps 120, gusset spreading wings 122, tucking plate 124 and valve pressing plates 126. The detailed construction of these members is best shown in Figs. 7 and 9 and as there shown the members are mounted on two main housings 128 and 130 which also enclose operating cams 132 carried by constant running primary drive shaft 36.

Vacuum lamps 120 which clamp gusset 48 for the valving operation are mounted on housing 128 by arms 134 which are pivoted on stationary shafts 136 and connected by the linkage indicated at 138 with arm 140 of shaft 142. Arm 144 mounted at the other end of shaft 142 carries roller 146 which follows groove 148 of cam 132. As roller 146 moves back and forth in groove 148, shaft 142 turns and moves arm 140 back and forth to open and close vacuum clamps 120. The hollow end portion 150 of each clamp is connected with a vacuum hose 152 (vacuum system later described) which provides vacuum at the face of the clamps by means of holes 154.

Housing 130 which mounts gusset spreading wings 122 and tucking plate 124 is rotatively mounted on primary shaft 36 and connected by link 156 to rock arm 158 on stationary shaft 160. Roller 162 of rock arm 158 travels in groove 164 of cam 132 which rocks arm 158 back and forth to rotate housing 130 on shaft 36. With the valving station at rest housing 130 is held below the level of bags 26 as shown in Fig. 1 and as a result the bags are free to pass over the spreading wings and tucking plate into position for valving. After a bag is in valving position housing 130 rocks in the direction of bag travel to position spreading wings 122 in gusset 48 and tucking plate 124 adjacent to the bag.

Spreading wings 122 which are adapted to open and separate gusset 48 are mounted by bolts 166 to shaft 168 and sleeve 170 respectively (Fig. 9). The shaft and sleeve are in turn connected with a pair of segment gears 172 by means of pinions 174. Segment gears 172 are pivotally mounted on stationary shaft 176 and connected to opposite ends of rock arm 178 by links 180. Roller 182 of rock arm 178 follows groove 184 of cam 132 and as a result arm 178 rocks back and forth on pin 186. This pivots segment gears 172 in opposite directions on shaft 176 and pinions 174 turn to open and close spreading wings 122. It is to be noted that shaft 168 and sleeve 170 provide a single axis of rotation for the spreading wings so that the walls of gusset 48 are evenly separated.

Tucking plate 124 is mounted on pedestal 188 and connected to shaft 190 by arm 191. Pinion 192 at the bottom of shaft 190 is meshed with gear segment 194 which rocks back and forth on pin 195 as roller 196 follows groove 198 of cam 132. This turns shaft 190 which swings tucking plate 124 into and out of bag blank 26 as required for the valving operation.

Pressing plates 126 which crease the paper to form the valve finished and ready for sleeving are pivotally mounted at the base of the hollow end portions 150 of vacuum clamps 120. Links 200 connect the pressing plates with arms 202 which are pivoted on arms 134 of clamps 120 and connected to arm 204 of shaft 206 by links 208. Shaft 206 also carries an arm 210 at its lower end and as roller 212 of arm 210 follows groove 214 of cam 132 the shaft moves arm 204 back and forth. This movement is transmitted to pressing plates 126 which close over the folded corner of the bag to crease it and form valve 118.

With valving station 20 at rest, vacuum clamps 120 and pressing plates 126 are held open in readiness to clamp and press the corner of bag blank 126. Spreading wings 122 are closed ready to enter gusset 48 and tucking plate 124 is in position to swing into the bag for folding the valve. At this time housing 130 is in the position shown in Fig. 1 and a bag blank 26 is moved over the housing and into position for valving.

Figure 11:
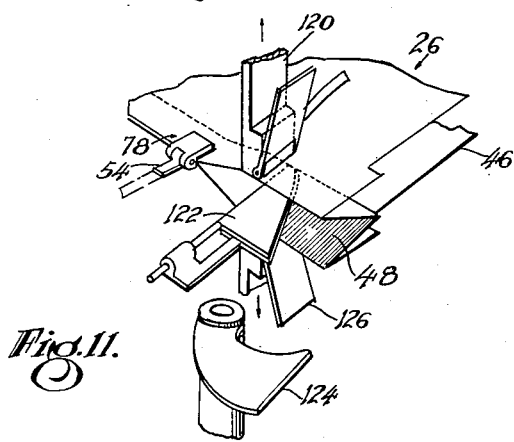

The valving operation involves the following sequence of movements schematically illustrated in Figs. 10 through 15. Vacuum clamps 120 make contact with either side of bag blank 26 and open slightly to separate gusset 48 by means of the vacuum applied to holes 154 (see Figs. 10 and 11). Housing 130 rocks the closed spreading wings 122 into gusset 48 as shown in Fig. 11 and then vacuum clamps 120 close on the gusset to firmly hold it for valving. The vacuum at holes 154 may be cut off at this time. It is to be noted that the apex of wings 122 register exactly with the center of gusset 48 because the apex is mechanically aligned with the interface between the closed clamps which constitute the sole support for the bag at this corner.

Figure 13:
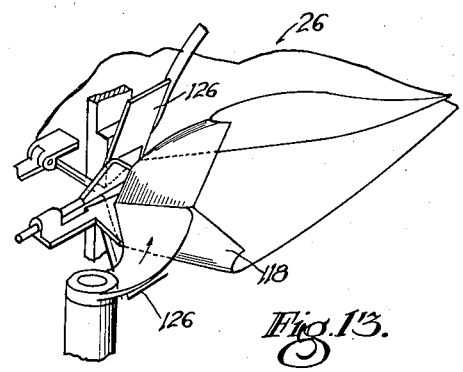
Figure 14:
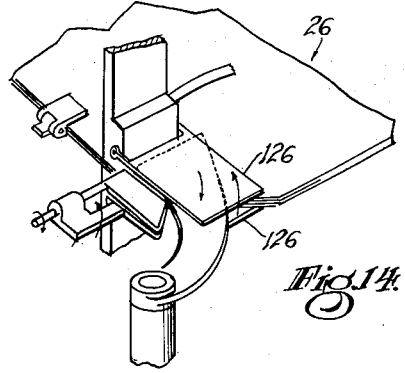
Figure 12:
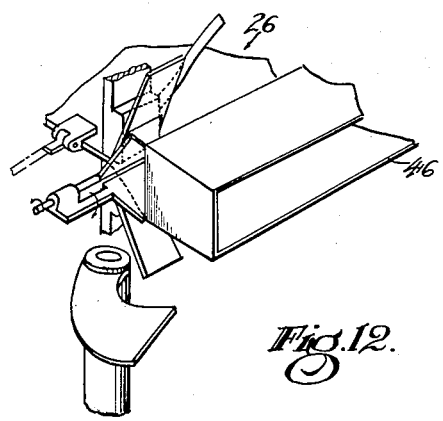
Figure 15:
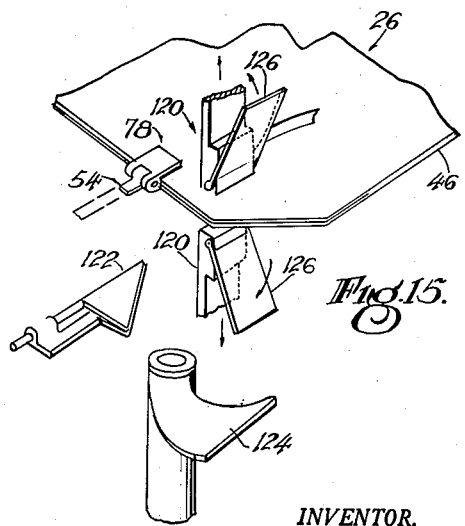

Wings 122 are now opened and they form an angle of less than 180° between them and preferably between 150° and 160°. This opens gusset 48 (Fig. 12) without putting excessive tension on the paper because the gusset is not spread flat and as a result any tendency for the paper to tear along the wing edges is substantially eliminated. As soon as the gusset is opened it is hit along its center line by tucking plate 124 which folds this corner of the bag inwardly to form a 90° angle between the center line at the bottom of gusset 48 and the edge of bag blank 26 (Figs. 13 and 14). Wings 122 close against tucking plate 124 and as they close housing 130 moves slightly away from gusset 48 to move the wings back and thus relieve tension on the folded paper. Pressing plates 126 then clamp over the wings and crease the paper into valve 118. The final creasing of the paper is a highly essential step in the formation of valve 118 because the pressing plates which are pivoted at the base of vacuum clamps 120 iron the excess paper in the bag walls away from the working edge of tucking plate 124 so that the finished valve is absolutely true with the corner of the bag. After valve 118 is formed the various valving members start toward their rest positions (Fig. 15) and belts 54 convey the valved bag blank 26 to sleeving station 22 and move a new blank into position for valving.

As belts 54 move the valved bag blank 26 toward sleeving station 22, clamp 78 on the right hand link belt 54 is opened by cam 216 (Fig. 2) which is mounted on belt 218 and positioned directly under the link belt. Belt 218 is mounted on pulleys 220 and driven by the forward pulley which is in turn mounted on primary drive shaft 38. When clamp 78 passes over belting 218 cam 216 hits lug 102 driving it into notch 104 to open the right hand clamp 78 for the sleeving operation.

In the sleeving operation a sleeve member 222 is inserted into valve 118 (see Fig. 6). As best shown in Fig. 5 each sleeve member comprises a length of stiff paper or the like turned up along one side to form a flange 224. A line of scoring 226 marks the center line across the sheet which corresponds with the center line of gusset 48 along the bottom of valve 118 when the sleeve is finally formed in the valve. A portion of one end of sheet 222 is cut away as indicated at 228 to provide a lip for inserting a filling spout in the finished bag.

Sleeve members 222 are made by the mechanism carried in upright frame 230 of sleeving station 22 from a roll of paper 232 supported at the right end of the frame by shaft 234 and standards 236 (see Figs. 1 and 2). The paper is drawn through the mechanism from right to left by pinch rolls 238 which advance it in segments equal to the length of sheets 222. A knife 240 supported in frame 230 just below pinch rolls 238 cuts the sleeve members from paper 232 as required for the sleeving operation (pinch rolls and knife later described).

In forming sleeve members 222 the paper preferably passes from the underside of roll 232 over idler 242 and through troughs 244 which accurately center it in die 246. Die 246 comprises two plates, a male plate 248 and a female plate 250 (see Figs. 16 and 18). Male plate 248 is mounted on four upright arms 252 which bear on eccentrics 254 of shafts 256 and 258. Shaft 256 is driven by primary shaft 38 through the chain and sprockets indicated at 260 in Fig. 2 and it in turn drives shaft 258 at the same speed through the gearing indicated at 262. Each time pinch rolls 238 (later described) draw a length of paper from roll 232 the eccentrics bring male plate 248 down into contact with female plate 250 to slit and score the paper as shown in Fig. 17. Slits 264 mark the ends of sleeve member 222 and the material between the slits is subsequently severed by knife 240 which hits the paper within the limits of cross slits 266. The line of scoring 266 marks the center line of sheet 222 and tab 268 outlined by slits 270 is later removed to form lip 228 in the finished bag.

Paper 232 moves from die 246 over idler 272 where tab 268 is removed and a continuous line of glue is applied along the left side of the paper (see Fig. 2). As the paper passes over idler 272 tab 268 sticks out and is pulled off the paper by rolls 274 which are mounted adjacent to idler 272 on shafts 276 and 278 respectively (see Fig. 18). Shaft 276 is driven by electric motor 280 through the belt and pulley indicated at 282 but shaft 278 idles and its roll rests on the roll of shaft 276 so that the rolls rotate in opposite directions to eject tab 268 from paper 232.

The line of glue is applied by roll 284 which is mounted in glue pot 286 by means of split shaft 288. Shaft 288 is held together by a flexible coupling 290 and driven by shaft 276 through the gearing indicated at 292. As roll 284 rotates it picks up glue 294 from pot 286 and applies it in a continuous line along the left side of paper 232. A scraper blade 298 keeps the glue film uniform on roll 284 and when the level in pot 286 falls below the outlet of hose 300 air enters bottle 302 to permit additional glue to flow down and maintain a constant supply in the pot. In order to remove pot 286 for cleaning it is mounted in slides 304 and by removing hose 300 and coupling 290 the pot is free to slide clear of frame 230.

After passing over idler 272 paper 232 travels between rolls 306 and 308 and wheels 310 and 312 where it is scored and folded to form flange 224 (see Fig. 2). The rolls and wheels are not driven but rotate with the paper as it passes between them. Roll 306 mounted on shaft 314 (see Figs. 19 and 20) has a flange 316 which cooperates with groove 318 of roll 308 to score the paper just inside the continuous line of glue. Roll 308 idles on shaft 320 and this shaft in turn is carried by a smaller shaft 322 which is mounted off center of shaft 320. As clearly shown in Fig. 16 the rolls are held in contact by the tension of spring 324 and by turning handle 326 of shaft 320 the rolls may be separated for feeding the paper between them.

The glued side of paper 232 is turned up and creased along the line of scoring by scoop 328 and wheels 310 and 312 (Figs. 21 and 22). Wheels 310 and 312 are mounted on shafts 330 and 332 respectively and wheel 310 fits into groove 334 of wheel 312 (Fig. 22). Bar 336 cooperates with scoop 328 to guide the paper between the wheels and form flange 224.

Below wheels 310 and 312 are pinch rolls 238 and knife 240 which as previously described feed and cut the paper as required for the sleeving operation (Fig. 2). These members as best shown in Figs. 23 and 24 are carried by bracket 338 which is slidably mounted in frame 230 by slides 340. Shafts 342 and 344 of pinch rolls 238 are mounted in four bearing blocks 346 and these in turn are slidably mounted in frames 348 of bracket 338 on slides 350. A spring 352 mounted in recess 354 between each pair of blocks 346 (see Fig. 25) tends to force the blocks apart and screw shafts 356 in threaded engagement with hubs 358 of frames 348 bear against blocks 346 to oppose the pressure. The position of screw shafts 356 is changed by means of the handle, chain and sprockets indicated at 360 to adjust the clearance between rolls 238 depending upon the thickness of paper 232.

Shaft 344 of pinch rolls 238 is driven by ratchet 362 and this shaft in turn drives shaft 342 in the opposite direction through the gearing indicated at 364. Ratchet 362 is meshed with gear rack 366 of arm 368 which is connected (Figs. 1 and 2) by means of slot 370 and bolt 372 with eccentric 374 which is in turn driven by primary shaft 38 through a conventional electric clutch 376.

In operation as each bag blank 26 moves toward sleeving station 22 it trips a lever and closes an electric circuit by means of an ordinary contact switch (lever, circuit and switch not shown). This actuates clutch 376 which engages shaft 38 to drive eccentric 374 through one complete revolution and move arm 368 up and down. Upon upward movement of arm 368 pinch rolls 238 rotate and draw the desired length of paper from roll 232. Upon downward movement, ratchet 362 runs free on shaft 344 and the paper is held stationary. It is to be noted that paper 232 is only advanced when a bag blank 26 moves into position for sleeving. Otherwise electric clutch 376 is not engaged with shaft 38 and the paper is held stationary.

Pinch rolls 238 feed the paper down between guide plates 378 (Fig. 23) until the top edge of sleeve member 222 as marked by slits 264 is just below the plates and opposite knife 240 (Fig. 36). At this time vacuum heads 380 engage sleeve member 222 along the outside of flange 224 and gripper 382 closes on the other side of the sheet at scoring 226 (vacuum heads and gripper later described).

Sleeve member 222 is now ready to be cut from paper 232 by knife 240 which is pivotally mounted on shaft 384 (Fig. 24) of frame 348 and connected to eccentric 386 of shaft 388 by means of arm 390, link 392 and split collar 394. As shown in Fig. 2 shaft 388 is driven by primary shaft 38 through the gearing indicated at 396 and as the shafts turn eccentric 386 (Fig. 24) moves arm 390 back and forth. As a result, knife 240 pivots and the tension of spring 394 makes it slide along the underside of beveled plate 396. This cuts the paper between slits 266 to release sleeve member 222 which is now ready for insertion into bag blank 26.

Generally speaking in the sleeving operation the top wall of bag blank 26 is lifted until the walls of valve 118 form an angle of approximately 90° with each other (see Figs. 36 to 40). While the bag blank is held in this position, flange 224 of sleeve member 222 is glued on the inside of the blank and the remainder of the sheet is then carried around the edge of the paper plies and positioned against the walls of valve 118 (Figs. 37 and 38). The finished sleeve is formed by creasing and pressing the sheet into valve 118. Vacuum clamp 398 in conjunction with holding plate 400 performs the lifting, pressing and creasing operations and vacuum heads 380 along with gripper 382 cooperate with abutment plate 402 to insert sleeve member 222 into valve 118.

As best shown in Figs. 16 and 18 vacuum clamp 398 which lifts the top wall of the bag comprises two clamping plates, a stationary plate 404 and a movable plate 406. Stationary plate 404 carries a main vacuum manifold 408 which supplies vacuum from hose 410 at the face of the plate by means of holes 412. In like manner vacuum is supplied at the face of movable plate 406 by vacuum hose 414, manifold 416 and holes 418. Stationary plate 404 and movable plate 406 also have auxiliary vacuum manifolds 419 and 420 respectively (Figs. 28, 29 and 30) which are connected by hose 422 to a low pressure vacuum system. These auxiliary manifolds supply vacuum at the edge of plates 404 and 406 by means of holes 424 and draw air from between the bag plies to hold them together (vacuum system later described).

Stationary plate 404 is held alongside the right hand link belt 54 on bracket 426 (Fig. 18) and movable plate 406 is carried on one end of arm 428 which is slidably mounted in frame 230 by rollers 430 and connected to rock arm 432 by means of link 434. Link 434 is free to pivot at each end where it is bolted to bracket 436 of arm 428 and to slot 440 of rock arm 432. Arm 432 is mounted on rock shaft 442 which is connected with cam 444 by means of arm 446 and roller 448 (see Fig. 16). Cam 444 revolves with shaft 256 which as previously described also carries eccentrics 254 for operating die 246 of the sleeve member forming mechanism. As roller 448 follows the groove of cam 444 it rocks arm 432 and moves arm 428 to open and close vacuum clamp 398 as shown in the full and dotted line positions of Fig. 18. During the sleeving operation vacuum clamps 398 hold the mouth of bag blank 26 open while vacuum heads 380 and gripper 382 position a sleeve member 222 in valve 118 (see Fig. 31).

Housing 450 (Fig. 2) carries the mechanism for operating vacuum heads 380 and this housing also encloses various operating cams for the sleeving station mounted on shaft 452. Shaft 452 is driven by primary shaft 38 through the gearing indicated at 454.

Since vacuum heads 380 place flange 224 of sheet 222 on the underside of the walls of valve 118 (Fig. 31) they first move into the mouth of bag 26 until they pass valve 118. The heads then move behind the valve walls and finally move out against the underside of valve 118 to press the glued side of flange 224 against it.

Movement of vacuum heads 380 behind the valve walls is controlled by carriage 456 mounted on shaft 458 which is in threaded engagement with split collar 460 and keyed to sleeve 462. Arm 464 at the bottom of sleeve 462 is connected by link 466 with arm 468. Arm 468 pivotally mounted on pin 470 in housing 450 moves back and forth as roller 472 follows the groove of cam 474 and this movement is transmitted by shaft 458 through carriage 456 to vacuum heads 380.

Movement of vacuum heads 380 into and out of bag blank 26 is controlled by rock arm 476. Rock arm 476 is pivotally mounted on pin 478 in housing 450 and connected by pin 480 with the fork of arm 482 mounted on rock shaft 484. Arms 486 are also mounted on rock shaft 484 and they slidably support shaft 488 by means of block 490 which is pivotally mounted between the arms on pin 492. Shaft 488 is held in a set position in block 490 by means of nuts 493 which are in threaded engagement with the shaft. At its other end, shaft 488 mounts vacuum heads 380 (later described) and the shaft is slidably supported at this end in sleeve 496 of bracket 498 which is pivotally mounted on carriage 456 by pin 500. As roller 502 of arm 476 follows the periphery of cam plate 504 it rocks arm 476 back and forth on pin 478 and this movement is transmitted by arms 486 to shaft 488 which slides vacuum heads 380 into and out of bag blank 26.

The hollow end portion of each vacuum head is connected with vacuum hose 506 which supplies vacuum at the face of the heads by means of holes 508 for holding flange 224 of sleeve member 222 (vacuum system described later). In order to fold sleeve member 222 to stiffen it and eliminate its tendency to twist while being moved into the bag, vacuum heads 380 are made to form an angle as they start toward the open bag mouth. For this purpose the vacuum heads are pivotally mounted on pin 512 and connected with links 514 of bracket 516 which is slidably mounted on shaft 488. Bracket 516 is in turn connected with arm 486 by means of link 518. Link 518 slides in swivel block 520 of arm 486 and is held in place by collars 522 and springs 524 which serve as a shock absorber between link 518 and block 520.

In operation the forward movement of arms 486 make shaft 488 travel a greater distance than link 518 because the shaft is mounted above link 518 on arm 486. As a result, vacuum heads 380 form an angle between them (see Fig. 37). This angle may vary from approximately 45° to 165° but for best results we prefer an angle of approximately 90°. On rearward movement the vacuum heads return to their initial vertical position.

Gripper 382 (Fig. 31) which cooperates with vacuum heads 380 for inserting the sleeve member 222 into bag blank 26, comprises a pair of V-shaped plates 526 and 528 hinged together by means of spring hinge 530 which normally tends to keep the plates apart.

V-plate 526 is mounted on arm 532 of bracket 534 which is pivotally mounted on shaft 488 and connected by link 536 and the gearing indicated at 538 with shaft 540. Shaft 540 is slidably supported in bracket 542 of frame 230 and this shaft mounts a slide bar 544 by means of arms 546. Bar 544 is free to slide in link 548 which is connected to rock arm 550 which is in turn connected by link 552 with arm 554 of shaft 556. Shaft 556 is rotatively mounted in frame 230 and connected with cam plate 558 by means of arm 560 and roller 562. The tension of spring 564 on arm 550 holds roller 562 against cam plate 558. Shaft 256 which carries cam 444 for operating vacuum clamps 398 also carries cam plate 558 and as roller 562 follows the periphery of cam plate 558 it rocks arm 550 and moves link 548 back and forth. This rotates shaft 540 and the movement is transmitted to bracket 534 which swings gripper 382 out toward valve 118.

V-plate 528 of gripper 382 is closed over plate 526 by means of air cylinder 566 which is mounted on V-plate 526 and connected with the compressed air system (later described) by hose 568. Spring hinge 530 of V-plate 528 is connected with piston 572 of air cylinder 566 and when compressed air is admitted at the top of cylinder 566 it forces piston 572 to the right to close gripper 382. When the air pressure is released, spring hinge 530 snaps the plates apart and the air is forced out of cylinder 566.

In operation, vacuum heads 380 and gripper 382 are initially positioned below the sheet forming mechanism where they receive a sleeve member 222 (see Figs. 1 and 36). Pinch rolls 232 in the sleeve member forming mechanism move paper 232 down in front of gripper plate 526 until scoring 226 is in line with the top of the V of plate 526 and opposite the space between adjacent edges of vacuum heads 380. At this time vacuum is applied to heads 380 and compressed air to cylinder 566 and as a result flange 224 is pulled against the vacuum heads 380 and gripper plate 528 closes over scoring 226 and against plate 526 (Fig. 36). The sleeve member 222 is then cut from paper 232 by knife 240 and vacuum heads 380 along with gripper 382 start the sheet toward bag blank 26.

As the vacuum heads move they form an angle of approximately 90° between the top and bottom halves of flange 224 which stiffens the sheet and fixes it in a set position for insertion into valve 118 (Fig. 37). Ordinarily excess paper formed by folding sheet 222 tends to gather against flange 224 but this is prevented by gripper 382 which swings scoring 226 out at an angle of approximately 45° with flange 224. When this is done the excess paper bows away from flange 224 to expose the base of the flange so that it can be readily fitted against the mouth of bag blank 26 at valve 118 (Fig. 38). If desired a stream of compressed air may be directed against sheet 222 on either side of scoring 226 to help bow out the excess paper in the sheet. This is readily accomplished with a U-shaped pipe 574 (Fig. 36), which is connected with the compressed air system (later described) by means of hose 576 and supported in frame 230 by bracket 578 with each leg of the U-pointed at opposite sides of sheet 222.

Vacuum heads 380 continue to move into the open mouth of bag blank 26 and after they pass the walls of valve 118 carriage 456 (Figs. 31 and 38) swings the heads into position directly behind the 90° walls of valve 118. Movement of the heads into the bag is then reversed by cam 504 and the heads carry flange 224 against the underside of the walls of valve 118.

In order to reinforce the valve so that flange 224 can be pressed against it, abutment plate 402 (Fig. 31) is positioned against the outside walls of the valve. The angle between the sides of abutment plate 402 corresponds to the 90° angle between the walls of valve 118 and the plate is slidably mounted in slot 580 of flange 582 which is in turn slidably mounted in slot 583 of bracket 584. Plate 402 and flange 582 are held in place by means of bolts 586.

Bracket 584 is slidably mounted on shaft 588 of housing 450 and connected by link 590 with arm 592 of shaft 594 which is in turn connected with the groove of cam 596 on shaft 452 by arm 598 and roller 600. As roller 600 follows the groove of cam 596 it turns shaft 594 to slide the abutment plate back and forth on shaft 588. Block 602 of bracket 584 slides along bar 604 which is pivotally mounted on shaft 588 by arms 606. Link 608 connects bar 604 with arm 610 of shaft 612 which is connected with cam 614 of shaft 452 by means of arm 618 and roller 620. As roller 620 travels in the groove of cam 614 it turns shaft 612 and moves abutment plate 402 into and out of contact with the walls of valve 118.

In operation, abutment plate 402 slides along shaft 588 until the leading edge of the plate is opposite the mouth of bag blank 26. The plate is then stopped and rocked against the walls of valve 118 to provide a bearing surface for vacuum heads 380 which press flange 224 against the underside of the valve walls (Fig. 38). Gripper 382 then swings scoring 226 against the bottom of the V of abutment plate 402 and as a result the sides of sheet member 222 flatten against the sides of the plate.

In order to hold sheet 222 in place while the above described members return to their starting position, holding plate 400 moves into the valve to press scoring 226 against valve 118 in the open section of abutment plate 402.

Holding plate 400 (Fig. 31) comprises a forward flexible element 621 for contacting the sleeve member mounted on a rigid element 622 by means of set screws 623. The rigid element 622 is pivotally mounted in slot 624 of movable plate 626 which is carried by link 627 and arm 628. Link 627 is rotatively mounted on stub shaft 630 of housing 450 and arm 628 is mounted on shaft 632 which is connected by arm 634 and roller 636 with the groove of cam 638 on shaft 452. As roller 636 travels in the groove of cam 638 it turns shaft 632 and as a result holding plate 400 is guided in a straight line in and out of valve 118 by link 626 and arm 628. Roller 640 of holding plate 400 rides on cam arm 642 of shaft 644 which is mounted in bracket 646 of housing 450 and connected by arm 648 and roller 650 with cam 652 on shaft 452. Roller 650 is held in contact with cam 652 by spring 654 and as the roller travels on the cam it rocks shaft 644 which raises cam arm 642 to depress holding plate 400.

In operation after sheet 222 is positioned against abutment plate 402, holding plate 400 moves into valve 118 to hold the sheet in a set position within the valve (Figs. 38, 39 and 40). Air pressure at the top of cylinder 566 is then released and the vacuum at the face of heads 380 is cut off. As a result, gripper 382 snaps open and the vacuum heads release their hold on sheet member 222. Vacuum heads 380 along with gripper 382 then return to their initial positions below the sheet member forming mechanism and abutment plate 402 slides from the valve. The abutment plate is rocked forward into its initial position after it clears sheet member 222. As soon as these members are clear of valve 118, movable plate 406 of vacuum clamp 398 starts down toward stationary plate 404 and holding plate 400 is depressed by cam 652 so that it follows along and continues to hold sleeve member 222 while vacuum clamp 398 creases and presses the sheet into valve 118 to form the finished sleeve 656 (see Fig. 40).

At the start of a sleeving cycle, vacuum clamp 398 is open, vacuum heads 380 and gripper 382 are holding a sheet of sleeve-forming material 222 ready for folding and insertion into valve 118, and abutment plate 402 and holding plate 400 are in position to enter valve 118. A valved bag blank is held in position for sleeving between plates 404 and 406 of clamp 398 by link belts 54. Bag clamps 78 on the right hand link belt is open so that the bag walls are free to separate. With the bag in this position its bottom wall is resting on stationary plate 404 and bag mouth 46 is even with the edge of the plate (see Figs. 28 and 36).

The sleeving operation involves the following sequence of movements schematically illustrated in Figs. 36 through 40. Vacuum is applied to clamp 398 and the bottom wall of the bag is pulled against stationary plate 404 where it is held by means of the vacuum at holes 412. Movable plate 406 makes contact with the top wall of the bag and then lifts to open bag mouth 46 by means of the vacuum at holes 418 until the walls of valve 118 form an angle of approximately ninety degrees between them (Figs. 36 and 37). As previously described the bag plies are held together by the vacuum at holes 424 which are positioned on the bag mouth where they draw air from between the plies.

While vacuum clamp 398 is opening the bag, vacuum heads 380 and gripper 382 move toward the open bag mouth and fold sheet member 222 into a three-dimensional form which exposes the base of flange 224 and makes the sheet extremely rigid for insertion in the valve.

Vacuum heads 380 continue to move the folded sheet into the bag and after the heads pass valve 118 carriage 456 swings them in behind the valve walls. By this time abutment plate 402 has moved into position against the outside of the valve (Fig. 38) and vacuum heads 380 reverse their movement and press the glued side of flange 224 against the underside of valve 118. It is to be noted that vacuum heads 380 are first lined up behind the walls of valve 118 and that they are then moved toward the bag mouth so that flange 224 makes absolutely flat contact with the underside of the valve walls and the exposed base of flange 224 is placed along the mouth of the bag.

Gripper 382 now swings scoring 226 against the bottom of the V of abutment plate 402 and as a result the sides of sheet member 222 flatten against the plate. Holding plate 400 then moves into the valve (Fig. 39) to anchor sheet member 222 in place and vacuum heads 380, gripper 382 and abutment plate 402 move out of the bag. As soon as these members are clear of the bag, movable plate 406 of clamp 398 starts down toward stationary plate 404 and holding plate 400 is depressed so that it continues to hold sheet member 222 while it is creased and pressed into valve 118 by clamp 398 to form the finished sleeve 656 (Fig. 40). After sleeve 656 is formed vacuum clamp 398 opens, holding plate 400 moves from the valve and link belts 54 convey the sleeved bag blank away and move a new valved bag into sleeving position at station 22.

As belts 54 convey the sleeved bag away clamp 78 on the left hand link belt is opened (Fig. 2) by cam bar 658 which is mounted under the left hand belt in the path of lug 102 of clamp 78. As clamp 78 passes over cam bar 658 lug 102 rides on the bar which cams the lug into notch 104 to open the clamp. The leading edge of the sleeved bag then moves between pinch rolls 660 (see Fig. 1) which remove the bag from belts 54 for further processing. The bottom pinch roll mounted on shaft 662 in frame 52 is driven by speed reducer 32 through the belt and pulleys indicated at 664. The top pinch roll on shaft 666 is carried by a pair of links 668 which are pivoted in brackets 670 of frame 52. The pinch rolls maintain gravity contact with each other and they give valve 118 a final pressing as they move the sleeved bag from belts 54.

As best shown in Fig. 41 the main vacuum system comprises a standard vacuum fan or air pump 672 which is capable of maintaining a vacuum of approximately one millimeter of mercury in pipe 674. Clamps 120 which separate the bag walls in valving station 20 receive vacuum from pipe 674 by means of hose 152 and valve 676. Valve 676 is a standard type of valve controlled by a plunger arm 678 which is held in contact with cam 680 mounted on constant running shaft 36. Arm 678 is normally held in the closed position by a spring inside the valve (not shown) and cam 680 depresses arm 678 to open the valve and supply vacuum to clamps 120 as required in the valving operation.

Vacuum heads 380 which carry sheet 222 into the bag are connected with the vacuum system by means of hose 506 and valve 682. This valve comprises a base plate 684 which is connected to pipe 674 by hole 686 and a movable plate 688 which is in turn connected with hose 506 by means of hole 690. The movable plate is slidably mounted on the base plate by pin 691. Spring 692 normally holds the plates of valve 682 in the closed position with the separate holes 686 and 690 against a solid portion of the plates. Roller 694 of movable plate 686 is positioned against cam plate 696 on shaft 388 which as previously described actuates knife 240. As cam 696 turns it slides the plates across each other and as a result holes 690 are brought in line to open the valve and supply vacuum to heads 380.

Clamp 398 which holds the bag mouth open in sleeving station 22 receives vacuum by means of hose 410 and 414 which are connected with the vacuum system by hose 698 and valve 700. Valve 700 is of the same construction as valve 682 (described above) and roller 702 of movable plate 704 is in contact with plate cam 706 on shaft 256 which also carries eccentrics 254 for operating die 246 of the sleeve member forming mechanism. As cam plate 706 turns it slides the plates across each other to open the valve and supply vacuum to clamp 398 as required in the sleeving operation.

A separate vacuum system is used for auxiliary manifolds 419 and 420 of clamp 398 which hold the paper plies together when the bag mouth is open during the sleeving operation. The suction used for this purpose is not as great as that used for separating the bag walls and it is supplied by a standard air pump 708 which is capable of maintaining a vacuum of the order of five to ten millimeters of mercury on pipe 710. This pipe is connected with the auxiliary manifolds by means of hose 422 and valve 712. Valve 712 is of the same construction as valve 682 and roller 714 of movable plate 716 is connected with cam plate 718 on shaft 36 which provides the power for valving station 20. Cam 718 is adapted to supply vacuum to the auxiliary manifolds 419 and 420 as required for the sleeving operation.

Compressed air for cylinder 566 which controls gripper 382 and for U-shaped pipe 574 which directs a stream of air against either side of sheet member 222 is supplied by pipe 720 which is connected with a conventional air compressor 721. An air reduction valve 722 controls air pressure in pipe 720 and this valve is set to give a pressure of approximately 15 pounds per square inch gauge pressure. Air is supplied to cylinder 566 by means of hose 568 and valve 724. Valve 724 is a standard type of air valve controlled by a plunger arm 726 which is held in contact with cam 728 mounted on shaft 256. Arm 726 is normally held in the closed position by a spring inside the valve (not shown) and cam 728 depresses arm 726 to supply air to cylinder 566 as required in the sleeving operation. U-shaped pipe 574 is connected to the compressed air pipe 720 by means of hose 576 and valve 730. This valve is of the same construction as valve 724 and plunger arm 732 is in contact with cam plate 734 on shaft 36 which controls the valve to supply the required air stream for the sleeving operation.

Various parts of the above described mechanism are made adjustable for valving and sleeving different sized bag blanks 26. In this connection it is to be noted that in placing the bags on link belts 54 the mouth of the bag is positioned against guide plate 111 and its trailing edge is positioned against clamps 78 so that these parts of the bag are always held in the same position at the valving and sleeving stations regardless of bag size. As a result, the size of valve 118 may be changed by changing the distance of valving station 20 from link belts 54. When this is done, the amount of paper folded into the corner of the bag by the valving mechanism is changed which in turn changes the valve size.

In order to make the position of valving station 20 adjustable base plate 736 (see Figs. 1, 7 and 8) of housing 128 and 130 is slidably mounted on frame 738 by means of slides 740. Bolt 742 rotatively mounted in frame 738 is in threaded engagement with collar 744 of plate 736 and by turning this bolt the distance between link belts 54 and housing 128 and 130 is changed. Since gear 746 of shaft 36 (Fig. 2) is free to slide on pinion 748 in gear box 34, changes in the position of housing 128 and 130 have no effect on the drive of shaft 36. For major changes in bag size the depth of gusset 48 changes appreciably and in such case it is desirable to change the size of spreading wings 122. This is readily done by removing bolts 166 and replacing the wings with another pair of a suitable size (see Fig. 9).

To change the size of sheet 222 for different sized valves, the position of arm 368 in slot 370 of eccentric 374 is changed by loosening bolt 372 (see Figs. 1 and 2). This changes the stroke of arm 368 and rotation of pinch rolls 238 and as a result the rolls feed a different sized sheet to vacuum heads 380. This necessitates two additional changes in the sheet-forming mechanism. The first of these involves changing the distance between pinch rolls 238 and vacuum heads 380 so that sheet 222 will continue to move into the same position against the vacuum heads. For this purpose collar 750 (Figs. 1, 16 and 23) of bracket 338 is in threaded engagement with shaft 752 which is supported at each end in frame 230 by suitable bearings indicated at 754. The shaft is hand-operated by means of handle 756 and to change the position of pinch rolls 238 split collar 394 (Fig. 24) on eccentric 386 of shaft 388 is first loosened by unscrewing set screw 758 and then handle 756 is turned to rotate the shaft and move bracket 338. This moves pinch rolls 238 into the desired position above vacuum heads 380.

The second change involves changing the distance between rolls 238 and die 246. This distance must be an exact multiple of sheet members 222 so that knife 240 will sever the paper between cross-slits 266. Two adjustments are provided for this purpose.

For major changes in this distance the length of frame 230 between die 246 and idler 272 is changed (see Figs. 1, 19 and 19a) by means of four movable bars 760 which are held on either side of stationary plate 762 of frame 230 by bolts 764 and cross members 766 and bolts 768. The bars are rigidly bolted together just beyond idler 272 by means of cross member 770 (Fig. 19). Gear racks 772 on the two bottom bars are meshed with pinion 774 of shaft 776. The shaft is hand-operated by handle 778 (Fig. 1) and to change the distance between die 246 and rolls 238 bolts 764 and 768 are first loosened and then handle 778 is turned to rotate pinion 774. When this is done, bars 760 slide freely in cross members 766 and bolts 764 travel in slots 780 of plate 762.

Minor changes in this distance are made by adjusting the position of idler 272 which is slidably mounted between bars 760 on shaft 782. Each end of shaft 782 is flattened on opposite sides to provide bearing surfaces 784 and the shaft is held in place between bars 760 by a set screw 786 which is mounted in cross member 770 and in threaded engagement with shaft 782 (see Fig. 19). By turning set screw 786 idler 272 is moved and the distance between rolls 238 and die 246 is changed. This change is necessarily small because rolls 274 only move with bars 760 and if idler 272 is moved too far away from rolls 274, tab 250 will not be ejected by the rolls.

In order to maintain the same angle between the walls of valve 118 for different sized bags the lift of movable plate 406 of vacuum clamp 398 is changed by adjusting the position of bolt 787 which holds link 434 in slot 440 of rock arm 432 (see Fig. 18). This change has no effect on the tension along the top wall of the bag because the radius of the curve followed by movable plate 406 is taken from clamp 78 on the left hand conveyor belt 54 and the distance from the bag mouth to this clamp is the same regardless of bag size. However, since the depth of gusset 48 changes with bag size the height of the center line at the bottom of valve 118 above stationary plate 404 changes as does its distance from the mouth of the bag. To compensate for these changes the height of vacuum heads 380 above stationary plate 404 and the distance the vacuum heads travel into the bag is changed.

This is readily done by rotating split collar 460 (see Fig. 31) which moves shaft 458 to changes the position of carriage 456 above housing 450 which in turn changes the height of the vacuum heads above stationary plate 404. When the height of carriage 456 is changed, pin 480 of rock arm 476 moves in the fork of arm 482 and this changes the throw of shaft 488 and the distance travelled by vacuum heads 380 into the bag. For smaller sized bags, carriage 456 is lowered and this moves pin 480 down into the fork of arm 482 so that the distance travelled by vacuum heads 380 is reduced. Since the ratio between the height of the center line at the bottom of valve 118 above stationary plate 404 and its distance from the bag mouth is constant regardless of bag size and since this ratio is set up in the mechanism which controls vacuum heads 380, the single adjustment in the height of carriage 456 takes care of both changes.

Holding plate 400 need not be adjusted for minor changes in valve size. However, for major changes the position of the plate is changed by loosening set screws 623 (Fig. 31) and sliding flexible element 621 into the desired position. As in the case of vacuum heads 380 this single adjustment compensates for the change in the height of the center line at the bottom of valve 118 above stationary plate 404 and for the change in its distance from the mouth of the bag.

Abutment plate 402 (Fig. 31) is adjusted for different-sized valves by turning bolts 586 which change the height of the plate and its distance from the valve so that the abutment plate will fit against the valve walls without distorting them.

As previously described the amount of paper tucked into the corner of the bag for valve 118 changes with the depth of gusset 48. As a result, the distance within valve 118 from the trailing edge of the bag to the mouth changes with the size of the valve and in order to accurately position the base of flange 224 of sheet 222 against the bag mouth for different sized valves, it is necessary to change the position of the sleeving station along the side of link belts 54. For this purpose base plate 788 (Fig. 1) of housing 450 is slidably mounted on frame 738 by slides 790. These slides are of the same construction as slides 740 used in valving station 20. Bolt 792 rotatively mounted in frame 738 is in threaded engagement with collar 794 of base plate 788 and by turning bolt 792 housing 450 is moved to adjust the contact position of vacuum heads 380 with the underside of the walls of valve 118. To compensate for this change, drive shaft 38 is provided with a flexible coupling 796 (Fig. 2) which comprises a stub shaft 798 pivotally mounted across the gap in shaft 38 by links 800. The drive of shaft 38 is transmitted through stub shaft 798 by means of four gears 802 which are mounted on the shafts and connected by link belts 804. When the sleeving station is moved, links 800 pivot on the shafts to allow for changes in the position of housing 450.

It will be understood that it is intended to cover all changes and modifications of the preferred embodiment of the invention herein chosen for the purpose of illustration which do not constitute departures from the spirit and scope of the invention.

What we claim is:

1. A machine for valving and sleeving gusseted bags comprising a valving station and a sleeving station, means for conveying bags through said stations, said conveying means being adapted to feed a bag into said valving station and simultaneously move a bag from the valving station into said sleeving station and hold said bags in a set position during the valving and sleeving operations, means positioned in said sleeving station for opening the bag mouth to form an angle of approximately forty-five to one hundred and sixty-five degrees between the valve walls, a pair of vacuum heads adapted to hold a sleeve member along a flange at one side thereof, means for moving the vacuum heads into and out of the bag to insert said sleeve member in the valve with the flange against the underside of the valve walls, said moving means being adapted to pivot the individual vacuum heads and form an angle of approximately forty-five to one hundred and sixty-five degrees between them whereby said flange is folded about a medial line thereof to stiffen the sheet and fix its position for insertion in the valve and said opening means being adapted thereafter to close the bag mouth and crease said sleeve member into sleeve form within the valve.

2. A machine for valving and sleeving gusseted bags comprising a valving station and a sleeving station, means for conveying bags through said stations, said conveying means being adapted to feed a bag into said valving station and simultaneously move a bag from the valving station into said sleeving station and hold said bags in a set position during the valving and sleeving operations, means positioned in said sleeving station for opening the bag mouth to form an angle of approximately forty-five to one hundred and sixty-five degrees between the valve walls, a pair of vacuum heads adapted to hold a sleeve member along a flange at one side thereof, a gripper adapted to grip an edge portion of said sleeve member directly opposite said flange at a medial line across said member, means for pivoting the vacuum heads to fold the flange about said medial line and form an angle of approximately forty-five to one hundred and sixty-five degrees between each half of said flange, means for swinging the gripper to move said medial line out at an angle of approximately forty-five degrees with said flange to bow the excess paper formed by folding the sleeve member away from the flange base said pivoting means being adapted to move the vacuum heads and gripper into and out of the bag and bring the vacuum heads into contact with the underside of the valve walls to press the flange against said walls, said means for swinging the gripper being adapted to carry the remainder of the sheet around the bag mouth and place it in the valve and said opening means being adapted thereafter to close the bag mouth and crease said sleeve member into sleeve form within the valve.

3. A machine for valving and sleeving gusseted bags comprising a valving station and a sleeving station, means for conveying bags through said stations, said conveying means being adapted to feed a bag into said valving station and simultaneously move a bag from the valving station into said sleeving station and hold said bags in a set position during the valving and sleeving operations, means positioned in said sleeving station for forming a flange along one side of a continuous strip of sleeving material adapted to advance successive end portions of said material into a set position, a pair of vacuum heads adapted to engage said flange and to hold the end portion in such set position, said forming means including a reciprocating die for scoring said end portions along one side and across a medial line thereof, means for applying a continuous line of paste on said end portion outside the line of the scoring along one side, means for turning up the pasted side of said end portions along the line of scoring to form a flange, means for severing said end portion from the continuous strip after it is engaged by said vacuum heads to form a sleeve member, means for supporting a valved bag, means for opening the bag mouth to form an angle of approximately ninety degrees between the valve walls, means for moving said vacuum heads into and out of the bag mouth adapted to pivot the heads and form an angle of approximately ninety degrees between them and to insert said sleeve member in the valve with the flange against the underside of the valve walls and said opening means being adapted thereafter to close the bag mouth and crease said sleeve member into sleeve form.

4. A method of valving and sleeving the open end of a multiwall gusseted bag in a machine of the type comprising a valving station and a sleeving station connected by a bag conveyor which comprises the steps of feeding a bag into said valving station, clamping the bag near an open corner thereof at said valving station, spreading the bag walls by opening the gusset at said corner, folding the opened gusset along with a portion of the walls into the bag mouth so that the central portion of such opened gusset lies at approximate right angles to its former position, closing the gusset and the separated bag walls and pressing the folded material to crease it and form the finished valve, then moving the valved bag from said valving station into said sleeving station, opening the valved bag mouth at said sleeving station to form an angle of approximately forty-five to one hundred and sixty-five degrees between the valve walls, folding a sleeve member with a flange along one side thereof about a medial line to form an angle of approximately ninety degrees between each half of said flange to stiffen the sleeve member and fix its position for insertion into the valve, placing the inside surface of said flange against the underside of the valve walls, folding the remainder of the sleeve member around the bag plies to position it in the valve, closing the bag mouth and pressing said sleeve member into sleeve form within the valve.

5. The method described in claim 4 which includes the step of holding the sleeve member in a set position in the valve during the creasing operation.

6. The method described in claim 4 which includes the step of reinforcing the valve walls to make them rigid while said flange is placed against the underside of the valve.

7. The method described in claim 4 which includes the step of moving said medial line out at an angle of approximately forty-five degrees to bow the excess paper formed by folding the sleeve member away from the flange base.

8. The method described in claim 4 which includes the step of drawing air from between the bag plies at the mouth of the bag to hold them together.

9. The method described in claim 4 which includes the steps of stamping a line of scoring along one side of an end portion of a continuous strip of sleeving material and across a medial line of said end portion, applying a continuous line of paste on said end portion outside of the scoring along one side, turning up the pasted side of said end portion to form a flange, moving successive end portions into a set position for insertion into the valve and severing said end portions from the continuous strip to form a sleeve member.

10. In an apparatus of the character described the combination which comprises means for supporting a valved bag, means for opening the bag mouth to form an angle of approximately forty-five to one hundred and sixty-five degrees between the valve walls, a pair of vacuum heads adapted to hold a sleeve member along a flange at one side thereof, a gripper adapted to grip an edge portion of said sleeve member directly opposite said flange at a medial line across said member, means for pivoting the vacuum heads to fold the flange about said medial line and form an angle of approximately forty-five to one hundred and sixty-five degrees between each half of said flange, means for swinging the gripper to move said medial line out at an angle of approximately forty-five degrees with said flange to bow the excess paper formed by folding the sleeve member away from the flange base, said pivoting means being adapted to move the vacuum heads and gripper into and out of the bag and bring the vacuum heads into contact with the underside of the valve walls to press the flange against the said walls, said means for swinging the gripper being adapted to carry the remainder of the sheet around the bag mouth and place it in the valve and said opening means being adapted thereafter to close the bag mouth and crease said sleeve member into sleeve form within the valve.

11. In an apparatus of the character described for valving and sleeving multiwall bags, the combination which comprises a stationary plate and a movable plate each of said plates being provided with an opening therein adapted to supply vacuum at the face of said plates for separating the bag walls, each of said plates being provided with an auxiliary plate with an opening therein positioned to contact the bag at its mouth, means for supplying vacuum at said openings in the auxiliary plates to draw air from between the bag plies and hold them together.

12. In an apparatus of the character described, the combination which comprises means for forming a flange along one side of a continuous strip of sleeving material adapted to advance successive end portions of said material into a set position, a pair of vacuum heads adapted to engage said flange and to hold the end portion in said set position, means for severing said end portion from the continuous strip after it is engaged by said vacuum heads to form a sleeve member, means for supporting a bag, means for opening the bag mouth to form an angle of approximately forty-five to one hundred and sixty-five degrees between the valve walls, means for moving said vacuum heads into and out of the bag mouth adapted to pivot the heads and form an angle of approximately forty-five to one hundred and sixty-five degrees between them and to insert said sleeve member in the valve with the flange against the underside of the valve walls and said opening means being adapted thereafter to close the bag mouth and crease said sleeve member into sleeve form.

13. In an apparatus of the character described the combination which comprises means for forming a flange along one side of a continuous strip of sleeving material adapted to advance successive end portions of said material into a set position, a pair of vacuum heads adapted to engage said flange and to hold the end portion in such set position, said forming means including a reciprocating die for scoring said end portions along one side and across a medial line thereof, means for applying a continuous line of paste on said end portion outside the line of the scoring along one side, means for turning up the pasted side of said end portions along the line of scoring to form a flange, means for severing said end portion from the continuous strip after it is engaged by said vacuum heads to form a sleeve member, means for supporting a valved bag, means for opening the bag mouth to form an angle of approximately ninety degrees between the valve walls, means for moving said vacuum heads into and out of the bag mouth adapted to pivot the heads and form an angle of approximately ninety degrees between them and to insert said sleeve member in the valve with the flange against the underside of the valve walls and said opening means being adapted thereafter to close the bag mouth and crease said sleeve member into sleeve form.

14. A method of forming a sleeve in the valve of a bag which comprises the steps of supporting the bag in a stationary position for sleeving, opening the bag mouth to form an angle of approximately forty-five to one hundred and sixty-five degrees between the valve walls, folding a sleeve member with a flange along one side thereof about a medial line to form an angle of approximately forty-five to one hundred and sixty-five degrees between each half of said flange to stiffen the sheet and fix its position for insertion into the valve, moving said medial line out at an angle of approximately forty-five degrees to bow the excess paper formed by folding the sleeve member away from the flange base, placing the inside surface of said flange against the underside of the valve walls, folding the remainder of the sleeve member around the bag plies to position it in the valve, closing the bag mouth and pressing said sleeve member into sleeve form within the valve.

15. A method as specified in claim 14 which includes the step of drawing air from between the bag plies at the mouth of the bag to hold them together.

16. In an apparatus of the character described the combination which comprises means for clamping the bag near an open corner thereof, a pair of spreading wings adapted to enter the gusset adjacent said clamping means, means for spreading the wings to open the gusset and separate the bag walls, means for folding the opened gusset along with a portion of the walls into the bag mouth so that the central portion of such opened gusset lies at approximate right angles to its former position, said means for spreading the wings being adapted thereafter to close the wings and fold and press the opened gusset and separated bag walls around the folding means while they remain in the bag to hold the folded central portion of the gusset in its position at approximate right angles to the edge of the bag to insure accurate forming of the finished valve and means associated with said spreading wings for moving the wings slightly away from the gusset as they fold the material around the folding means to relieve tension on the paper.

17. In an apparatus of the character described, the combination which comprises a continuous straight line conveyor for moving a plurality of gusseted bags from an initial feeding point to a delivery point for further processing, a mechanism for valving the bags positioned adjacent said conveyor and at an intermediate point between said feeding and delivery points, a Geneva drive for driving said conveyor in step by step movement to move successive bags into and out of a stationary position at said valving mechanism for valving the bag, and thereafter to move the bags to said delivery point, said valving mechanism including means for clamping the gusset of the stationary bag near an open corner thereof, spreading means adapted to enter the gusset adjacent said clamping means and separate the bag walls by opening said gusset, means for folding the open gusset along with a portion of the walls into the bag mouth so that the central portion of said opened gusset lies at approximately right angles to its former position and said spreading means being adapted thereafter to close the gusset and the separated bag walls to form the finished valve means for mounting said spreading means and folding means in the path of bag travel, said mounting means including a support member for the spreading means and folding means and means for moving said support member and the spreading means and folding means carried thereby downwardly out of the path of the bags after the valve is formed to allow such bag to pass and for moving said support member and the spreading means and folding means carried thereby back up into the path of bag travel for valving successive bags.

18. In an apparatus of the character described, the combination which comprises a continuous straight line conveyor for moving a plurality of gusseted bags from an initial feeding point to a delivery point for further processing, a mechanism for valving the bags positioned adjacent said conveyor and at an intermediate point between said feeding and delivery points, a Geneva drive for driving said conveyor in step by step movement to move successive bags into and out of a stationary position at said valving mechanism for valving the bag and thereafter to move the bags to said delivery point, said valving mechanism including means for clamping the gusset of the stationary bag near an open corner thereof, spreading means adapted to enter the gusset adjacent said clamping means and separate the bag walls by opening said gusset, means for folding the open gusset along with a portion of the walls into the bag mouth so that the central portion of said opened gusset lies at approximately right angles to its former position, and said spreading means being adapted thereafter to close the gusset and the separated bag walls to form the finished valve, means for mounting said spreading means and folding means in the path of bag travel, said means including a support member rotatively mounted on an axis extending substantially perpendicular to the line of bag travel, means for rotating said support member and the spreading means and folding means carried thereby downwardly out of the path of the bags after the valve is formed to allow the valved bag to pass and for moving said support member and the spreading means and folding means carried thereby back up into the path of bag travel for valving the next successive bag.

19. In an apparatus of the character described, the combination which comprises a continuous straight line conveyor for moving a plurality of gusseted bags from an initial feeding point to a delivery point for further processing, a mechanism for valving the bags positioned adjacent said conveyor and at an intermediate point between said feeding and delivery points, a Geneva drive for driving said conveyor in step by step movement to move successive bags into and out of a stationary position at said valving mechanism for valving the bag and thereafter to move the bags to said delivery point, said valving mechanism including means for clamping the gusset of the stationary bag near an open corner thereof, spreading means adapted to enter the gusset adjacent said clamping means and separate the bag walls by opening said gusset, means for folding the open gusset along with a portion of the walls into the bag mouth so that the central portion of said opened gusset lies at approximately right angles to its former position, and said spreading means being adapted thereafter to close and press the opened gusset and separated bag walls around the folding means while said folding means remain in the bag to hold the folded central portion of the gusset in its position at approximate right angles to the edge of the bag to insure accurate forming of the finished valve and means for moving said spreading means slightly away from the gusset as they fold and press the material around the folding means to relieve tension on the paper.

20. In an apparatus of the character described, the combination which comprises a continuous straight line conveyor for moving a plurality of gusseted bags from an initial feeding point to a delivery point for further processing, a mechanism for valving the bags positioned adjacent said conveyor and at an intermediate point between said feeding and delivery points, a Geneva drive for driving said conveyor in step by step movement to move successive bags into and out of a stationary position at said valving mechanism for valving the bag, and thereafter to move the bags to said delivery point, said valving mechanism including a pair of clamps one positioned above and the second one positioned below the gusset of the stationary bag near an open corner thereof, means for bringing the clamps together to hold the gusset closed near such open corner of the bag, spreading means adapted to enter the gusset adjacent said clamping means and separate the bag walls by opening the gusset, means for folding the opened gusset along with a portion of the walls into the bag mouth so that the central portion of said opened gusset lies at approximate right angles to its former position, said spreading means being adapted thereafter to close the gusset and the separated bag wall, a pair of pressing plates pivotally mounted on said clamps adjacent to the folded material of the bag, one of said plates being pivotally mounted on the bottom edge of the top clamp and the second of said plates being pivotally mounted on the top edge of the bottom clamp, and means for moving said plates together to press the folded portion of the bag walls and iron them out against said spreading means and away from said clamping means whereby the folded material is accurately creased to form the finished valve.

21. A structure as specified in claim 20 in which the spreading means are positioned in the valving mechanism below the level of the bags and means for swinging the wings up to the level of the bag and in the direction of bag travel to enter the gusset adjacent said clamping means.

References Cited in the file of this patent
UNITED STATES PATENTS

| | | |
|---|---|---|
| Re. 23,486 | Lee | Apr. 29, 1952 |
| 969,418 | Staude | Sept. 6, 1910 |
| 1,779,817 | Lane | Oct. 28, 1930 |
| 1,997,290 | Barber | Apr. 9, 1935 |
| 2,257,502 | Jirousek | Sept. 30, 1941 |
| 2,300,553 | Lee et al. | Nov. 3, 1942 |
| 2,559,873 | Grupe et al. | July 10, 1951 |